(12) United States Patent
Hamza et al.

(10) Patent No.: US 8,090,157 B2
(45) Date of Patent: Jan. 3, 2012

(54) APPROACHES AND APPARATUS FOR EYE DETECTION IN A DIGITAL IMAGE

(75) Inventors: Rida M. Hamza, Maple Grove, MN (US); Terry Ahrens, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1178 days.

(21) Appl. No.: 11/672,108

(22) Filed: Feb. 7, 2007

(65) Prior Publication Data

US 2007/0189582 A1  Aug. 16, 2007

Related U.S. Application Data

(63) Continuation-in-part of application No. 11/275,703, filed on Jan. 25, 2006, now Pat. No. 7,593,550, application No. 11/672,108, which is a continuation-in-part of application No. 11/043,366, filed on Jan. 26, 2005, now Pat. No. 7,756,301, which is a continuation-in-part of application No. 11/372,854, filed on Mar. 10, 2006.

(60) Provisional application No. 60/778,770, filed on Mar. 3, 2006, provisional application No. 60/647,270, filed on Jan. 26, 2005.

(51) Int. Cl.
*G06K 9/00* (2006.01)
(52) U.S. Cl. ........................................ 382/115; 382/117
(58) Field of Classification Search .................. 382/115, 382/117; 348/78; 396/18, 51
See application file for complete search history.

(56) References Cited

U.S. PATENT DOCUMENTS

| 4,641,349 | A | 2/1987 | Flom et al. |
| 4,836,670 | A | 6/1989 | Hutchinson |
| 5,231,674 | A | 7/1993 | Cleveland et al. |
| 5,291,560 | A | 3/1994 | Daugman |
| 5,293,427 | A | 3/1994 | Ueno et al. |
| 5,359,382 | A | 10/1994 | Uenaka |
| 5,404,013 | A | 4/1995 | Tajima |
| 5,551,027 | A | 8/1996 | Choy et al. |
| 5,572,596 | A | 11/1996 | Wildes et al. |

(Continued)

FOREIGN PATENT DOCUMENTS

EP  0484076  5/1992

(Continued)

OTHER PUBLICATIONS

Avcibas et al., "Steganalysis Using Image Quality Metrics," IEEE Transactions on Image Processing, vol. 12, No. 2, pp. 221-229, Feb. 2003.

(Continued)

*Primary Examiner* — Brian Q Le
(74) *Attorney, Agent, or Firm* — Seager, Tufte & Wickhem LLC

(57) ABSTRACT

A system for finding and providing images of eyes acceptable for review, recordation, analysis, segmentation, mapping, normalization, feature extraction, encoding, storage, enrollment, indexing, matching, and/or the like. The system may acquire images of the candidates run them through a contrast filter. The images may be ranked and a number of candidates may be extracted for a list from where a candidate may be selected. Metrics of the eyes may be measured and their profiles evaluated. Also, the spacing between a pair of eyes may be evaluated to confirm the pair's validity. Eye images that do not measure up to certain standards may be discarded and new ones may be selected.

21 Claims, 15 Drawing Sheets

U.S. PATENT DOCUMENTS

| | | | |
|---|---|---|---|
| 5,608,472 A | 3/1997 | Szirth et al. |
| 5,664,239 A | 9/1997 | Nakata |
| 5,717,512 A | 2/1998 | Chmielewski, Jr. et al. |
| 5,751,836 A | 5/1998 | Wildes et al. |
| 5,859,686 A | 1/1999 | Aboutalib et al. |
| 5,860,032 A | 1/1999 | Iwane |
| 5,896,174 A | 4/1999 | Nakata |
| 5,901,238 A | 5/1999 | Matsushita |
| 5,909,269 A | 6/1999 | Isogai et al. |
| 5,953,440 A | 9/1999 | Zhang et al. |
| 5,956,122 A | 9/1999 | Doster |
| 5,978,494 A | 11/1999 | Zhang |
| 6,005,704 A | 12/1999 | Chmielewski, Jr. et al. |
| 6,007,202 A | 12/1999 | Apple et al. |
| 6,012,376 A | 1/2000 | Hanke et al. |
| 6,021,210 A | 2/2000 | Camus et al. |
| 6,028,949 A | 2/2000 | McKendall |
| 6,055,322 A | 4/2000 | Salganicoff et al. |
| 6,064,752 A | 5/2000 | Rozmus et al. |
| 6,069,967 A | 5/2000 | Rozmus et al. |
| 6,081,607 A | 6/2000 | Mori et al. |
| 6,088,470 A | 7/2000 | Camus et al. |
| 6,091,899 A | 7/2000 | Konishi et al. |
| 6,101,477 A | 8/2000 | Hohle et al. |
| 6,104,431 A | 8/2000 | Inoue et al. |
| 6,108,636 A | 8/2000 | Yap et al. |
| 6,119,096 A | 9/2000 | Mann et al. |
| 6,120,461 A | 9/2000 | Smyth |
| 6,134,339 A | 10/2000 | Luo |
| 6,144,754 A | 11/2000 | Okano et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,282,475 B1 | 8/2001 | Washington |
| 6,285,505 B1 | 9/2001 | Melville et al. |
| 6,285,780 B1 | 9/2001 | Yamakita et al. |
| 6,289,113 B1 | 9/2001 | McHugh et al. |
| 6,299,306 B1 | 10/2001 | Braithwaite et al. |
| 6,308,015 B1 | 10/2001 | Matsumoto |
| 6,309,069 B1 | 10/2001 | Seal et al. |
| 6,320,610 B1 | 11/2001 | Van Sant et al. |
| 6,320,612 B1 | 11/2001 | Young |
| 6,320,973 B2 | 11/2001 | Suzaki et al. |
| 6,323,761 B1 | 11/2001 | Son |
| 6,325,765 B1 | 12/2001 | Hay et al. |
| 6,330,674 B1 | 12/2001 | Angelo et al. |
| 6,332,193 B1 | 12/2001 | Glass et al. |
| 6,344,683 B1 | 2/2002 | Kim |
| 6,370,260 B1 | 4/2002 | Pavlidis et al. |
| 6,377,699 B1 | 4/2002 | Musgrave et al. |
| 6,393,136 B1 | 5/2002 | Amir et al. |
| 6,400,835 B1 | 6/2002 | Lemelson et al. |
| 6,424,727 B1 | 7/2002 | Musgrave et al. |
| 6,424,845 B1 | 7/2002 | Emmoft et al. |
| 6,433,818 B1 | 8/2002 | Steinberg et al. |
| 6,438,752 B1 | 8/2002 | McClard |
| 6,441,482 B1 | 8/2002 | Foster |
| 6,446,045 B1 | 9/2002 | Stone et al. |
| 6,483,930 B1 | 11/2002 | Musgrave et al. |
| 6,484,936 B1 | 11/2002 | Nicoll et al. |
| 6,490,443 B1 | 12/2002 | Freeny, Jr. |
| 6,493,363 B1 | 12/2002 | Roger et al. |
| 6,493,669 B1 | 12/2002 | Curry et al. |
| 6,494,363 B1 | 12/2002 | Roger et al. |
| 6,503,163 B1 | 1/2003 | Van Sant et al. |
| 6,505,193 B1 | 1/2003 | Musgrave et al. |
| 6,506,078 B1 | 1/2003 | Mori et al. |
| 6,508,397 B1 | 1/2003 | Do |
| 6,516,078 B1 | 2/2003 | Yang et al. |
| 6,516,087 B1 | 2/2003 | Camus |
| 6,516,416 B2 | 2/2003 | Gregg et al. |
| 6,522,772 B1 | 2/2003 | Morrison et al. |
| 6,523,165 B2 | 2/2003 | Liu et al. |
| 6,526,160 B1 | 2/2003 | Ito |
| 6,532,298 B1 | 3/2003 | Cambier et al. |
| 6,540,392 B1 | 4/2003 | Braithwaite |
| 6,542,624 B1 | 4/2003 | Oda |
| 6,546,121 B1 | 4/2003 | Oda |
| 6,553,494 B1 | 4/2003 | Glass |
| 6,580,356 B1 | 6/2003 | Alt et al. |
| 6,591,001 B1 | 7/2003 | Oda et al. |
| 6,591,064 B2 | 7/2003 | Higashiyama et al. |
| 6,594,377 B1 | 7/2003 | Kim et al. |
| 6,594,399 B1 | 7/2003 | Camus et al. |
| 6,598,971 B2 | 7/2003 | Cleveland |
| 6,600,878 B2 | 7/2003 | Pregara |
| 6,614,919 B1 | 9/2003 | Suzaki et al. |
| 6,652,099 B2 | 11/2003 | Chae et al. |
| 6,674,367 B2 | 1/2004 | Sweatte |
| 6,690,997 B2 | 2/2004 | Rivalto |
| 6,708,176 B2 | 3/2004 | Strunk et al. |
| 6,711,562 B1 | 3/2004 | Ross et al. |
| 6,714,665 B1 * | 3/2004 | Hanna et al. .................. 382/117 |
| 6,718,049 B2 | 4/2004 | Pavlidis et al. |
| 6,718,665 B2 | 4/2004 | Hess et al. |
| 6,732,278 B2 | 5/2004 | Baird, III et al. |
| 6,734,783 B1 | 5/2004 | Anbai |
| 6,745,520 B2 | 6/2004 | Puskaric et al. |
| 6,750,435 B2 | 6/2004 | Ford |
| 6,751,733 B1 | 6/2004 | Nakamura et al. |
| 6,753,919 B1 | 6/2004 | Daugman |
| 6,754,640 B2 | 6/2004 | Bozeman |
| 6,760,467 B1 | 7/2004 | Min et al. |
| 6,765,470 B2 | 7/2004 | Shinzaki |
| 6,766,041 B2 | 7/2004 | Golden et al. |
| 6,775,774 B1 | 8/2004 | Harper |
| 6,785,406 B1 | 8/2004 | Kamada |
| 6,793,134 B2 | 9/2004 | Clark |
| 6,819,219 B1 | 11/2004 | Bolle et al. |
| 6,829,370 B1 | 12/2004 | Pavlidis et al. |
| 6,832,044 B2 | 12/2004 | Doi et al. |
| 6,836,554 B1 | 12/2004 | Bolle et al. |
| 6,837,436 B2 | 1/2005 | Swartz et al. |
| 6,845,479 B2 | 1/2005 | Park |
| 6,853,444 B2 | 2/2005 | Haddad |
| 6,867,683 B2 | 3/2005 | Calvesio et al. |
| 6,873,960 B1 | 3/2005 | Wood et al. |
| 6,896,187 B2 | 5/2005 | Stockhammer |
| 6,905,411 B2 | 6/2005 | Nguyen et al. |
| 6,920,237 B2 | 7/2005 | Chen et al. |
| 6,930,707 B2 | 8/2005 | Bates et al. |
| 6,934,849 B2 | 8/2005 | Kramer et al. |
| 6,950,139 B2 | 9/2005 | Fujinawa |
| 6,954,738 B2 | 10/2005 | Wang et al. |
| 6,957,341 B2 | 10/2005 | Rice et al. |
| 6,972,797 B2 | 12/2005 | Izumi |
| 6,992,562 B2 | 1/2006 | Fuks et al. |
| 7,053,948 B2 | 5/2006 | Konishi |
| 7,071,971 B2 | 7/2006 | Elberbaum |
| 7,084,904 B2 | 8/2006 | Liu et al. |
| 7,136,581 B2 | 11/2006 | Fujii |
| 7,183,895 B2 | 2/2007 | Bazakos et al. |
| 7,184,577 B2 | 2/2007 | Chen et al. |
| 7,197,173 B2 | 3/2007 | Jones et al. |
| 7,204,425 B2 | 4/2007 | Mosher, Jr. et al. |
| 7,277,891 B2 | 10/2007 | Howard et al. |
| 7,298,873 B2 | 11/2007 | Miller, Jr. et al. |
| 7,315,233 B2 | 1/2008 | Yuhara |
| 7,362,210 B2 | 4/2008 | Bazakos et al. |
| 7,362,370 B2 | 4/2008 | Sakamoto et al. |
| 7,362,884 B2 | 4/2008 | Willis et al. |
| 7,365,771 B2 | 4/2008 | Kahn et al. |
| 7,406,184 B2 | 7/2008 | Wolff et al. |
| 7,414,648 B2 | 8/2008 | Imada |
| 7,417,682 B2 | 8/2008 | Kuwakino et al. |
| 7,418,115 B2 | 8/2008 | Northcott et al. |
| 7,421,097 B2 | 9/2008 | Hamza et al. |
| 7,443,441 B2 | 10/2008 | Hiraoka |
| 7,460,693 B2 * | 12/2008 | Loy et al. .................. 382/118 |
| 7,471,451 B2 | 12/2008 | Dent et al. |
| 7,486,806 B2 | 2/2009 | Azuma et al. |
| 7,518,651 B2 | 4/2009 | Butterworth |
| 7,537,568 B2 | 5/2009 | Moehring |
| 7,538,326 B2 | 5/2009 | Johnson et al. |
| 7,542,945 B2 | 6/2009 | Thompson et al. |
| 7,580,620 B2 | 8/2009 | Raskar et al. |
| 7,593,550 B2 | 9/2009 | Hamza |

| | | | | | |
|---|---|---|---|---|---|
| 7,639,846 B2 | 12/2009 | Yoda | 2003/0125054 A1 | 7/2003 | Garcia |
| 7,722,461 B2 | 5/2010 | Gatto et al. | 2003/0125057 A1 | 7/2003 | Pesola |
| 7,751,598 B2 | 7/2010 | Matey et al. | 2003/0126560 A1 | 7/2003 | Kurapati et al. |
| 7,756,301 B2 | 7/2010 | Hamza | 2003/0131245 A1 | 7/2003 | Linderman |
| 7,756,407 B2 | 7/2010 | Raskar | 2003/0131265 A1 | 7/2003 | Bhakta |
| 7,761,453 B2 | 7/2010 | Hamza | 2003/0133597 A1 | 7/2003 | Moore et al. |
| 7,777,802 B2 | 8/2010 | Shinohara et al. | 2003/0140235 A1 | 7/2003 | Immega et al. |
| 7,804,982 B2 | 9/2010 | Howard et al. | 2003/0140928 A1 | 7/2003 | Bui et al. |
| 2001/0026632 A1 | 10/2001 | Tamai | 2003/0141411 A1 | 7/2003 | Pandya et al. |
| 2001/0027116 A1 | 10/2001 | Baird | 2003/0149881 A1 | 8/2003 | Patel et al. |
| 2001/0047479 A1 | 11/2001 | Bromba et al. | 2003/0152251 A1 | 8/2003 | Ike |
| 2001/0051924 A1 | 12/2001 | Uberti | 2003/0152252 A1 | 8/2003 | Kondo et al. |
| 2001/0054154 A1 | 12/2001 | Tam | 2003/0156741 A1 | 8/2003 | Lee et al. |
| 2002/0010857 A1 | 1/2002 | Karthik | 2003/0158762 A1 | 8/2003 | Wu |
| 2002/0033896 A1 | 3/2002 | Hatano | 2003/0158821 A1 | 8/2003 | Maia |
| 2002/0039433 A1 | 4/2002 | Shin | 2003/0159051 A1 | 8/2003 | Hollnagel |
| 2002/0040434 A1 | 4/2002 | Elliston et al. | 2003/0163739 A1 | 8/2003 | Armington et al. |
| 2002/0062280 A1 | 5/2002 | Zachariassen et al. | 2003/0169334 A1 | 9/2003 | Braithwaite et al. |
| 2002/0077841 A1 | 6/2002 | Thompson | 2003/0169901 A1 | 9/2003 | Pavlidis et al. |
| 2002/0089157 A1 | 7/2002 | Breed et al. | 2003/0169907 A1 | 9/2003 | Edwards et al. |
| 2002/0106113 A1 | 8/2002 | Park | 2003/0173408 A1 | 9/2003 | Mosher, Jr. et al. |
| 2002/0112177 A1 | 8/2002 | Voltmer et al. | 2003/0174049 A1 | 9/2003 | Beigel et al. |
| 2002/0114495 A1 | 8/2002 | Chen et al. | 2003/0177051 A1 | 9/2003 | Driscoll et al. |
| 2002/0130961 A1 | 9/2002 | Lee et al. | 2003/0182151 A1 | 9/2003 | Taslitz |
| 2002/0131622 A1* | 9/2002 | Lee et al. ............ 382/106 | 2003/0182182 A1 | 9/2003 | Kocher |
| 2002/0139842 A1 | 10/2002 | Swaine | 2003/0189480 A1 | 10/2003 | Hamid |
| 2002/0140715 A1 | 10/2002 | Smet | 2003/0189481 A1 | 10/2003 | Hamid |
| 2002/0142844 A1 | 10/2002 | Kerr | 2003/0191949 A1 | 10/2003 | Odagawa |
| 2002/0144128 A1 | 10/2002 | Rahman et al. | 2003/0194112 A1 | 10/2003 | Lee |
| 2002/0150281 A1 | 10/2002 | Cho | 2003/0195935 A1 | 10/2003 | Leeper |
| 2002/0154794 A1 | 10/2002 | Cho | 2003/0198368 A1 | 10/2003 | Kee |
| 2002/0158750 A1 | 10/2002 | Almalik | 2003/0200180 A1 | 10/2003 | Phelan, III et al. |
| 2002/0164054 A1 | 11/2002 | McCartney et al. | 2003/0210139 A1 | 11/2003 | Brooks et al. |
| 2002/0175182 A1 | 11/2002 | Matthews | 2003/0210802 A1 | 11/2003 | Schuessier |
| 2002/0186131 A1 | 12/2002 | Fettis | 2003/0218719 A1 | 11/2003 | Abourizk et al. |
| 2002/0191075 A1 | 12/2002 | Doi et al. | 2003/0225711 A1 | 12/2003 | Paping |
| 2002/0191076 A1 | 12/2002 | Wada et al. | 2003/0228898 A1 | 12/2003 | Rowe |
| 2002/0194128 A1 | 12/2002 | Maritzen et al. | 2003/0233556 A1 | 12/2003 | Angelo et al. |
| 2002/0194131 A1 | 12/2002 | Dick | 2003/0235326 A1 | 12/2003 | Morikawa et al. |
| 2002/0198731 A1 | 12/2002 | Barnes et al. | 2003/0235411 A1 | 12/2003 | Morikawa et al. |
| 2003/0002714 A1 | 1/2003 | Wakiyama | 2003/0236120 A1 | 12/2003 | Reece et al. |
| 2003/0012413 A1 | 1/2003 | Kusakari et al. | 2004/0001614 A1 | 1/2004 | Russon et al. |
| 2003/0014372 A1 | 1/2003 | Wheeler et al. | 2004/0002894 A1 | 1/2004 | Kocher |
| 2003/0020828 A1 | 1/2003 | Ooi et al. | 2004/0005078 A1 | 1/2004 | Tillotson |
| 2003/0038173 A1 | 2/2003 | Blackson et al. | 2004/0006553 A1 | 1/2004 | de Vries et al. |
| 2003/0046228 A1 | 3/2003 | Berney | 2004/0010462 A1 | 1/2004 | Moon et al. |
| 2003/0053663 A1 | 3/2003 | Chen et al. | 2004/0012760 A1 | 1/2004 | Mihashi et al. |
| 2003/0055689 A1 | 3/2003 | Block et al. | 2004/0019570 A1 | 1/2004 | Bolle et al. |
| 2003/0055787 A1 | 3/2003 | Fujii | 2004/0023664 A1 | 2/2004 | Mirouze et al. |
| 2003/0058492 A1 | 3/2003 | Wakiyama | 2004/0023709 A1 | 2/2004 | Beaulieu et al. |
| 2003/0061172 A1 | 3/2003 | Robinson | 2004/0025030 A1 | 2/2004 | Corbett-Clark et al. |
| 2003/0061233 A1 | 3/2003 | Manasse et al. | 2004/0025031 A1 | 2/2004 | Ooi et al. |
| 2003/0065626 A1 | 4/2003 | Allen | 2004/0025053 A1 | 2/2004 | Hayward |
| 2003/0071743 A1 | 4/2003 | Seah et al. | 2004/0029564 A1 | 2/2004 | Hodge |
| 2003/0072475 A1 | 4/2003 | Tamori | 2004/0030930 A1 | 2/2004 | Nomura |
| 2003/0073499 A1 | 4/2003 | Reece | 2004/0035123 A1 | 2/2004 | Kim et al. |
| 2003/0074317 A1 | 4/2003 | Hofi | 2004/0037450 A1 | 2/2004 | Bradski |
| 2003/0074326 A1 | 4/2003 | Byers | 2004/0037452 A1* | 2/2004 | Shin ............ 382/117 |
| 2003/0076161 A1 | 4/2003 | Tisse | 2004/0039914 A1 | 2/2004 | Barr et al. |
| 2003/0076300 A1 | 4/2003 | Lauper et al. | 2004/0042641 A1 | 3/2004 | Jakubowski |
| 2003/0076984 A1 | 4/2003 | Tisse et al. | 2004/0044627 A1 | 3/2004 | Russell et al. |
| 2003/0080194 A1 | 5/2003 | O'Hara et al. | 2004/0046640 A1 | 3/2004 | Jourdain et al. |
| 2003/0091215 A1 | 5/2003 | Lauper et al. | 2004/0049687 A1 | 3/2004 | Orsini et al. |
| 2003/0092489 A1 | 5/2003 | Veradej | 2004/0050924 A1 | 3/2004 | Mletzko et al. |
| 2003/0095689 A1 | 5/2003 | Volkommer et al. | 2004/0050930 A1 | 3/2004 | Rowe |
| 2003/0098776 A1 | 5/2003 | Friedli | 2004/0052405 A1 | 3/2004 | Walfridsson |
| 2003/0099379 A1 | 5/2003 | Monk et al. | 2004/0052418 A1 | 3/2004 | DeLean |
| 2003/0099381 A1 | 5/2003 | Ohba | 2004/0059590 A1 | 3/2004 | Mercredi et al. |
| 2003/0103652 A1 | 6/2003 | Lee et al. | 2004/0059953 A1 | 3/2004 | Purnell |
| 2003/0107097 A1 | 6/2003 | McArthur et al. | 2004/0104266 A1 | 6/2004 | Bolle et al. |
| 2003/0107645 A1 | 6/2003 | Yoon | 2004/0117636 A1 | 6/2004 | Cheng |
| 2003/0108224 A1 | 6/2003 | Ike | 2004/0133804 A1 | 7/2004 | Smith et al. |
| 2003/0108225 A1 | 6/2003 | Li | 2004/0146187 A1 | 7/2004 | Jeng |
| 2003/0115148 A1 | 6/2003 | Takhar | 2004/0148526 A1 | 7/2004 | Sands et al. |
| 2003/0115459 A1 | 6/2003 | Monk | 2004/0160518 A1 | 8/2004 | Park |
| 2003/0116630 A1 | 6/2003 | Carey et al. | 2004/0162870 A1 | 8/2004 | Matsuzaki et al. |
| 2003/0118212 A1 | 6/2003 | Min et al. | 2004/0162984 A1 | 8/2004 | Freeman et al. |
| 2003/0118217 A1 | 6/2003 | Kondo et al. | 2004/0169817 A1 | 9/2004 | Grotehusmann et al. |
| 2003/0123711 A1 | 7/2003 | Kim et al. | 2004/0172541 A1 | 9/2004 | Ando et al. |

| | | | | | | |
|---|---|---|---|---|---|---|
| 2004/0174070 | A1 | 9/2004 | Voda et al. | EP | 1018297 | 7/2000 |
| 2004/0190759 | A1 | 9/2004 | Caldwell | EP | 1024463 | 8/2000 |
| 2004/0193893 | A1 | 9/2004 | Braithwaite et al. | EP | 1028398 | 8/2000 |
| 2004/0219902 | A1 | 11/2004 | Lee et al. | EP | 1041506 | 10/2000 |
| 2004/0233038 | A1 | 11/2004 | Beenau et al. | EP | 1041523 | 10/2000 |
| 2004/0240711 | A1 | 12/2004 | Hamza et al. | EP | 1126403 | 8/2001 |
| 2004/0252866 | A1 | 12/2004 | Tisse et al. | EP | 1139270 | 10/2001 |
| 2004/0255168 | A1 | 12/2004 | Murashita et al. | EP | 1237117 | 9/2002 |
| 2005/0008200 | A1 | 1/2005 | Azuma et al. | EP | 1477925 | 11/2004 |
| 2005/0008201 | A1 | 1/2005 | Lee et al. | EP | 1635307 | 3/2006 |
| 2005/0012817 | A1 | 1/2005 | Hampapur et al. | GB | 2369205 | 5/2002 |
| 2005/0029353 | A1 | 2/2005 | Isemura et al. | GB | 2371396 | 7/2002 |
| 2005/0041867 | A1* | 2/2005 | Loy et al. ............ 382/190 | GB | 2375913 | 11/2002 |
| 2005/0052566 | A1 | 3/2005 | Kato | GB | 2402840 | 12/2004 |
| 2005/0055582 | A1 | 3/2005 | Bazakos et al. | GB | 2411980 | 9/2005 |
| 2005/0063567 | A1 | 3/2005 | Saitoh et al. | JP | 9161135 | 6/1997 |
| 2005/0084137 | A1 | 4/2005 | Kim et al. | JP | 9198545 | 7/1997 |
| 2005/0084179 | A1 | 4/2005 | Hanna et al. | JP | 9201348 | 8/1997 |
| 2005/0099288 | A1 | 5/2005 | Spitz et al. | JP | 9147233 | 9/1997 |
| 2005/0102502 | A1 | 5/2005 | Sagen | JP | 9234264 | 9/1997 |
| 2005/0110610 | A1 | 5/2005 | Bazakos et al. | JP | 9305765 | 11/1997 |
| 2005/0125258 | A1 | 6/2005 | Yellin et al. | JP | 9319927 | 12/1997 |
| 2005/0127161 | A1 | 6/2005 | Smith et al. | JP | 10021392 | 1/1998 |
| 2005/0129286 | A1 | 6/2005 | Hekimian | JP | 10040386 | 2/1998 |
| 2005/0134796 | A1 | 6/2005 | Zelvin et al. | JP | 10049728 | 2/1998 |
| 2005/0138385 | A1 | 6/2005 | Friedli et al. | JP | 10137219 | 5/1998 |
| 2005/0138387 | A1 | 6/2005 | Lam et al. | JP | 10137221 | 5/1998 |
| 2005/0146640 | A1 | 7/2005 | Shibata | JP | 10137222 | 5/1998 |
| 2005/0151620 | A1 | 7/2005 | Neumann | JP | 10137223 | 5/1998 |
| 2005/0152583 | A1 | 7/2005 | Kondo et al. | JP | 10248827 | 9/1998 |
| 2005/0193212 | A1 | 9/2005 | Yuhara | JP | 10269183 | 10/1998 |
| 2005/0199708 | A1 | 9/2005 | Friedman | JP | 11047117 | 2/1999 |
| 2005/0206501 | A1 | 9/2005 | Farhat | JP | 11089820 | 4/1999 |
| 2005/0206502 | A1 | 9/2005 | Bernitz | JP | 11200684 | 7/1999 |
| 2005/0207614 | A1 | 9/2005 | Schonberg et al. | JP | 11203478 | 7/1999 |
| 2005/0210267 | A1 | 9/2005 | Sugano et al. | JP | 11213047 | 8/1999 |
| 2005/0210270 | A1 | 9/2005 | Rohatgi et al. | JP | 11339037 | 12/1999 |
| 2005/0210271 | A1 | 9/2005 | Chou et al. | JP | 2000005149 | 1/2000 |
| 2005/0238214 | A1 | 10/2005 | Matsuda et al. | JP | 2000005150 | 1/2000 |
| 2005/0240778 | A1 | 10/2005 | Saito | JP | 2000011163 | 1/2000 |
| 2005/0248725 | A1 | 11/2005 | Ikoma et al. | JP | 2000023946 | 1/2000 |
| 2005/0249385 | A1 | 11/2005 | Kondo et al. | JP | 2000083930 | 3/2000 |
| 2005/0255840 | A1 | 11/2005 | Markham | JP | 2000102510 | 4/2000 |
| 2006/0093190 | A1 | 5/2006 | Cheng et al. | JP | 2000102524 | 4/2000 |
| 2006/0147094 | A1 | 7/2006 | Yoo | JP | 2000105830 | 4/2000 |
| 2006/0165266 | A1 | 7/2006 | Hamza | JP | 2000107156 | 4/2000 |
| 2006/0274919 | A1 | 12/2006 | LoIacono et al. | JP | 2000139878 | 5/2000 |
| 2007/0036397 | A1 | 2/2007 | Hamza | JP | 2000155863 | 6/2000 |
| 2007/0140531 | A1 | 6/2007 | Hamza | JP | 2000182050 | 6/2000 |
| 2007/0160266 | A1 | 7/2007 | Jones et al. | JP | 2000185031 | 7/2000 |
| 2007/0206840 | A1 | 9/2007 | Jacobson | JP | 2000194972 | 7/2000 |
| 2007/0211924 | A1 | 9/2007 | Hamza | JP | 2000237167 | 9/2000 |
| 2007/0274570 | A1 | 11/2007 | Hamza | JP | 2000242788 | 9/2000 |
| 2007/0274571 | A1 | 11/2007 | Hamza | JP | 2000259817 | 9/2000 |
| 2007/0286590 | A1 | 12/2007 | Terashima | JP | 2000356059 | 12/2000 |
| 2008/0005578 | A1 | 1/2008 | Shafir | JP | 2000357232 | 12/2000 |
| 2008/0075334 | A1 | 3/2008 | Determan et al. | JP | 2001005948 | 1/2001 |
| 2008/0075441 | A1 | 3/2008 | Jelinek et al. | JP | 2001067399 | 3/2001 |
| 2008/0104415 | A1 | 5/2008 | Palti-Wasserman et al. | JP | 2001101429 | 4/2001 |
| 2008/0148030 | A1 | 6/2008 | Goffin | JP | 2001167275 | 6/2001 |
| 2008/0211347 | A1 | 9/2008 | Wright et al. | JP | 2001222661 | 8/2001 |
| 2008/0252412 | A1 | 10/2008 | Larsson et al. | JP | 2001292981 | 10/2001 |
| 2008/0267456 | A1 | 10/2008 | Anderson | JP | 2001297177 | 10/2001 |
| 2009/0046899 | A1 | 2/2009 | Northcott et al. | JP | 2001358987 | 12/2001 |
| 2009/0092283 | A1 | 4/2009 | Whillock et al. | JP | 2002119477 | 4/2002 |
| 2009/0316993 | A1 | 12/2009 | Brasnett et al. | JP | 2002133415 | 5/2002 |
| 2010/0002913 | A1 | 1/2010 | Hamza | JP | 2002153444 | 5/2002 |
| 2010/0033677 | A1 | 2/2010 | Jelinek | JP | 2002153445 | 5/2002 |
| 2010/0034529 | A1 | 2/2010 | Jelinek | JP | 2002260071 | 9/2002 |
| 2010/0142765 | A1 | 6/2010 | Hamza | JP | 2002271689 | 9/2002 |
| 2010/0182440 | A1 | 7/2010 | McCloskey | JP | 2002286650 | 10/2002 |
| 2010/0239119 | A1 | 9/2010 | Bazakos et al. | JP | 2002312772 | 10/2002 |
| | | | | JP | 2002329204 | 11/2002 |
| | | FOREIGN PATENT DOCUMENTS | | JP | 2003006628 | 1/2003 |
| EP | | 0593386 | 4/1994 | JP | 2003036434 | 2/2003 |
| EP | | 0878780 | 11/1998 | JP | 2003108720 | 4/2003 |
| EP | | 0899680 | 3/1999 | JP | 2003108983 | 4/2003 |
| EP | | 0910986 | 4/1999 | JP | 2003132355 | 5/2003 |
| EP | | 0962894 | 12/1999 | JP | 2003150942 | 5/2003 |

| | | |
|---|---|---|
| JP | 2003153880 | 5/2003 |
| JP | 2003242125 | 8/2003 |
| JP | 2003271565 | 9/2003 |
| JP | 2003271940 | 9/2003 |
| JP | 2003308522 | 10/2003 |
| JP | 2003308523 | 10/2003 |
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | 03003910 | 1/2003 |
| WO | WO 03/002387 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | WO 2006/081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.
Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.
Daugman, "How Iris Recognition Works," IEEE 2002 International Conference on Image Processing, vol. I of III, 6 pages, Sep. 22-25, 2002.
Guo et al., "A System for Automatic Iris Capturing," Mitsubishi Electric Research Laboratories, Inc., 10 pages, 2005.
Guo, "Face, Expression, and Iris Recognition Using Learning-Based Approaches," 132 pages, 2006.
Jalaja et al., "Texture Element Feature Characterizations for CBIR," IEEE, pp. 733-736, 2005.
Kalka et al., "Image Quality Assessment for Iris Biometric," Proc. of SPIE vol. 6202 62020D, 11 pages, 2006.
Ko et al., "Monitoring and Reporting of Fingerprint Image Quality and Match Accuracy for a Large User Application," IEEE Computer Society, Proceedings of the 33rd Applied Imagery Pattern Recognition Workshop, 6 pages, 2004.
Lau et al., "Finding a Small Number of Regions in an Image Using Low-Level Features," Pattern Recognition 35, pp. 2323-2339, 2002.
Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.
Oppenheim et al, "The Importance of Phase in Signals," Proceedings of the IEEE, vol. 69, No. 5, pp. 529-541, 1981.
Ratha et al., "A Real-Time Matching System for Large Fingerprint Databases," IEEE Transactions on Pattern Analysis, and Machine Intelligence, vol. 18, No. 8, pp. 799-812, Aug. 1996.
Sony, "Network Color Camera, SNC-RZ3ON (NTSC)," 6 pages, Aug. 2002.
Wang et al, "Image Quality Assessment: From Error Visibility to Structural Similarity," IEEE Transactions on Image Processing, vol. 13, No. 4, pp. 600-612, Apr. 2004.
Wang et al., "A Universal Image Quality Index," IEEE Signal Processing Letters, vol. 9, No. 3, pp. 81-84, Mar. 2002.
Wang et al., "Local Phase Coherence and the Perception of Blur," Advances in Nueral Information Processing Systems 16, pp. 1435-1442, 2004.
Bonney et al., "Iris Pattern Extraction Using Bit Planes and Standard Deviations," IEEE, pp. 582-586, 2004.
Camus et al., "Reliable and Fast Eye Finding in Close-up Images," IEEE, pp. 389-394, 2002.

Cui et al., "A Fast and Robust Iris Localization Method Based on Texture Segmentation," 8 pages, 2004.
Cui et al., "An Appearance-Based Method for Iris Detection," 6 pages, 2004.
Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.
Cui et al., "An Iris Image Synthesis Method Based on PCA and Super-Resolution," IEEE Computer Society, Proceedings of the 17th International Conference on Pattern Recognition, 6 pages, Aug. 23-26, 2004.
Cui et al., "An Iris Recognition Algorithm Using Local Extreme Points," Biometric Authentication, First International Conference, ICBA 2004, Hong Kong, China, 10 pages, Jul. 15-17, 2004.
Daugman, "Results From 200 Billion Iris Cross-Comparisons," University of Cambridge Computer Laboratory, Technical Report, No. 635, 8 pages, Jun. 2005.
Du et al., "A One-Dimensional Approach for Iris Identification," 11 pages, prior to Jan. 25, 2006.
http://www.newscientisttech.com/article/dn11110-invention-covert-iris-sc, "Invention: Covert Iris Scanner," 3 pages, printed Feb. 8, 2007.
Huang et al., "Iris Model Based on Local Orientation Description," 5 pages, prior to Jan. 25, 2006.
Huang et al., "An Efficient Iris Recognition System," IEEE Proceedings of the First International Conference on Machine Learning and Cybernetics, Beijing, pp. 450-454, Nov. 4-5, 2002.
Ma et al., "Personal Identification Based on Iris Texture Analysis," IEEE Transactions on Pattern Analysis and Machine Intelligence, vol. 25, No. 12, pp. 1519-1533, Dec. 2003.
Masek, "Recognition of Human Iris Patterns for Biometric Identification," 61 pages, 2003.
Sun et al., "Robust Encoding of Local Ordinal Measures: A General Framework of Iris Recognition," 13 pages, prior to Jan. 25, 2006.
Chow et al., "Towards a System for Automatic Facial Feature Detection," Pattern Recognition, No. 12, pp. 1739-1755, Dec. 26, 1993.
AOptix Technologies, "Introducing the AOptix InSight 2 Meter Iris Recognition System," 6 pages, 2010.
Belhumeur et al., "Eigenfaces Vs. Fisherfaces: Recognition Using Class Specific Linear Projection," 14 pages, prior to Jun. 11, 2010.
Bentley et al., "Multidimensional Binary Search Trees Used for Associative Searching," Communications of the ACM, vol. 18, No. 9, pp. 509-517, Sep. 1975.
Blackman et al., "Chapter 9, Multiple Sensor Tracking: Issues and Methods," Design and Analysis of Modern Tracking Systems, Artech House, pp. 595-659, 1999.
Brasnett et al., "A Robust Visual Identifier Using the Trace Transform," 6 pages, prior to Jun. 11, 2010.
Buades et al., "A Review of Image Denoising Algorithms, with a New One," Multiscale Modeling & Simulation, vol. 4, No. 2, pp. 490-530, 2005.
Chen et al., "Localized Iris Image Quality Using 2-D Wavelets," LNCS vol. 3832, pp. 373-381, 2005.
U.S. Appl. No. 12/792,498, filed Jun. 2, 2010.
U.S. Appl. No. 12/814,232, filed Jun. 11, 2010.
U.S. Appl. No. 12/814,272, filed Jun. 11, 2010.
U.S. Appl. No. 12/875,372, filed Sep. 3, 2010.
Cula et al., "Bidirectional Imaging and Modeling of Skin Texture," Proceedings of Texture 2003, 6 pages, Oct. 17, 2003.
Cula et al., "Bidirectional Imaging and Modeling of Skin Texture," IEEE Transactions on Biomedical Engineering, vol. 51, No. 12, pp. 2148-2159, 2004.
Cula et al., "Compact Representation of Bidirectional Texture Functions," Proceedings of IEEE Computer Society Conference on Computer Vision and Pattern Recognition 2001, 8 pages, 2001.
Cula et al., "Skin Texture Modeling," International Journal of Computer Vision 2004, 34 pages, 2004.
Dabov et al., "Image Denoising by Sparse 3-D Transform-Domain Collaborative Filtering," IEEE Transactions on Image Processing, vol. 16, No. 8, pp. 2080-2095, Aug. 2007.
Dabov et al., "Image Restoration by Spars 3D Transform Collaborative Filtering," SPIE vol. 6812 681207-1, 12 pages, 2008.
Daugman, "High Confidence Visual Recognition of Persons by a Test of Statistical Independence," IEEE Transactions on Pattern Analysis and Machine Intelligence, vol. 15, No. 11, pp. 1148-1161, 1993.
Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.
Fooprateepsiri et al., "A Highly Robust Method for Face Authentication," IEEE 2009 First Asian Conference on Intelligent Information and Database Systems, pp. 380-385, 2009.
Fooprateepsiri et al., "Face Verification Base-On Hausdorff-Shape Context," IEEE 2009 Asia Conference on Informatics in Control, Automation and Robotics, pp. 240-244, 2009.
Forstner et al., "A Metric for Covariance Matrices," 16 pages, prior to Jun. 11, 2010.
Gan et al., "Applications of Wavelet Packets Decomposition in Iris Recognition," LNCS vol. 3832, pp. 443-449, 2005.
Hampapur et al., "Smart Surveillance: Applications, Technologies and Implications," IEEE, 6 pages, Dec. 15-18, 2003.
Hamza et al., "Standoff Iris Recognition Usin Non-Iterative Polar Based Segmentation," Proceedings of SPIE vol. 6944, 8 pages, 2008.
Hanna et al., "A System for Non-Intrusive Human Iris Acquisition and Identification," IAPR Workshop on Machine Vision Applications, pp. 200-203, Nov. 12-14, 1996.
http://en.wikipedia.org/wiki/Radon_transform, "Radon Transform," 5 pages, printed May 14, 2010.
Ivins et al., "A Deformable Model of the Human Iris for Measuring Small Three-Dimensional Eye Movements," Machine Vision and Applications, vol. 11, pp. 42-51, 1998.
Kadyrov et al., "The Trace Transform and Its Applications," IEEE Transactions on Pattern Analysis and Machine Intelligence, vol. 23, No. 8, pp. 811-828, Aug. 2001.
Kadyrov et al., "The Trace Transform as a Tool to Invariant Feature Construction," 3 pages, prior to Jun. 11, 2010.
Kang et al., "Improved Dual Action Contour for Iris Recognition," 10 pages, prior to Jun. 11, 2010.
Kawaguchi et al., "Detection of Eyes from Human Faces by Hough Transform and Separability Filter," IEEE, 4 pages, 2000.
Kong et al., "Detecting Eyelash and Reflection for Accurate Iris Segmentation," International Journal of Pattern Recognition and Artificial Intelligence, vol. 17, No. 6, pp. 1025-1034, 2003.
Li et al., "Appearance Modeling Using a Geometric Transform," IEEE Transactions on Image Processing, 17 pages, 2008.
Li et al., "Appearance Modeling Using a Geometric Transform," Journal Preparation for IEEE Transactions on Image Processing, 30 pages, Nov. 5, 2006.
Ma et al., "Local Intensity Variation Analysis for Iris Recognition," Pattern Recognition, vol. 37, pp. 1287-1298, 2004.
Ma et al., "Video Sequence Querying Using Clustering of Objects' Appearance Models," Advances in Visual Computing Third Annual Symposium, ISVC 2007, 14 pages, 2007.
Monro et al., "DCT-Based Iris Recognition," IEEE Transactions on Pattern Analysis and Machine Intelligence, vol. 29, No. 4, Apr. 2007.
Noh et al., "A Novel Method to Extract Features for Iris Recognition System," AVBPA 2003, LNCS 2688, pp. 862-868, 2003.
Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.
Pamudurthy et al., "Dynamic Approach for Face Recognition Using Digital Image Skin Correlation," Audio and Video Based Person Authentication 5th International Conference, AVBPA 2005, Hilton Rye Town, NY, USA, 11 pages, Jul. 20-22, 2005.
Petrou et al., "The Trace Transform in a Nutshell," 9 pages, prior to Jun. 11, 2010.
Phillips et al., "FRVT 2006 and ICE 2006 Large-Scale Results," 56 pages, Mar. 2007.
Porikli et al., "Covariance Tracking Using Model Update Based on Means on Riemannian Manifolds," 8 pages, prior to Jun. 11, 2010.
Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.

Ross et al., "Segmenting Non-Ideal Irises Using Geodesic Active Contours," IEEE 2006 Biometrics Symposium, 3 pages, 2006.

Shapiro et al., pp. 556-559 in Book Entitled "Computer Vision," Prentice Hall, prior to Jun. 11, 2010.

Stillman et al., "A System for Tracking and Recognizing Multiple People with Multiple Cameras," 6 pages, Aug. 1998.

Sun et al., "Iris Recognition Based on Non-local Comparisons," Sinobiometrics 2004, LNCS 3338, pp. 67-77, 2004.

Suzaki et al., "A Horse Identification System Using Biometrics," Systems and Computer in Japan, vol. 32, No. 14, pp. 12-23, 2001.

Trucco et al., "Robust Iris Location in Close-up Images of the Eye," Pattern Anal. Applic. vol. 8, pp. 247-255, 2005.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wang et al., "Recent Developments in Human Motion Analysis," Pattern Recognition, vol. 36, pp. 585-601, 2003.

Wei et al., "Robust and Fast Assessment of Iris Image Quality," LNCS vol. 3832, pp. 464-471, 2005.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

Zhi-Hui et al., "Research Iris Serial Images Quality Assessment Method Based on HVS," Proceedings of SPIE, vol. 6034, 6 pages, 2006.

U.S. Appl. No. 13/077,821, filed Mar. 30 2011.

Freeboy, "Adaptive Optics Speeds Up Airport Immigration," Optics. org/ole, 2 pages, Jan. 2009.

http://www.imagine-eyes.com/content/view/100/115/, "INOVEO—Ultra-High Resolution Retinal Imaging with Adaptive Optics," 2 pages, printed Feb. 22, 2010.

* cited by examiner

APPROACHES AND APPARATUS FOR EYE DETECTION IN A DIGITAL IMAGE

This application is a continuation-in-part of U.S. patent application Ser. No. 11/275,703, filed Jan. 25, 2006, which claims the benefit of U.S. Provisional Application No. 60/647,270, filed Jan. 26, 2005.

This application is a continuation-in-part of U.S. patent application Ser. No. 11/043,366, filed Jan. 26, 2005.

This application is a continuation-in-part of U.S. patent application Ser. No. 11/372,854, filed Mar. 10, 2006;

This application claims the benefit of U.S. Provisional Application No. 60/778,770, filed Mar. 3, 2006.

The government may have rights in the present invention.

BACKGROUND

Related applications may include U.S. patent application Ser. No. 10/979,129, filed Nov. 3, 2004, which is a continuation-in-part of U.S. patent application Ser. No. 10/655,124, filed Sep. 5, 2003, which are hereby incorporated by reference, and U.S. patent application Ser. No. 11/382,373, filed May 9, 2006, which is hereby incorporated by reference.

U.S. patent application Ser. No. 11/275,703, filed Jan. 25, 2006, is hereby incorporated by reference.

U.S. Provisional Application No. 60/647,270, filed Jan. 26, 2005, is hereby incorporated by reference.

U.S. patent application Ser. No. 11/043,366, filed Jan. 26, 2005, is hereby incorporated by reference.

U.S. patent application Ser. No. 11/372,854, filed Mar. 10, 2006, is hereby incorporated by reference.

U.S. Provisional Application No. 60/778,770, filed Mar. 3, 2006, is hereby incorporated by reference.

SUMMARY

The invention is an approach and apparatus for localizing eyes of a human in a digital image to be processed for iris recognition.

DESCRIPTION

Figure 1A:
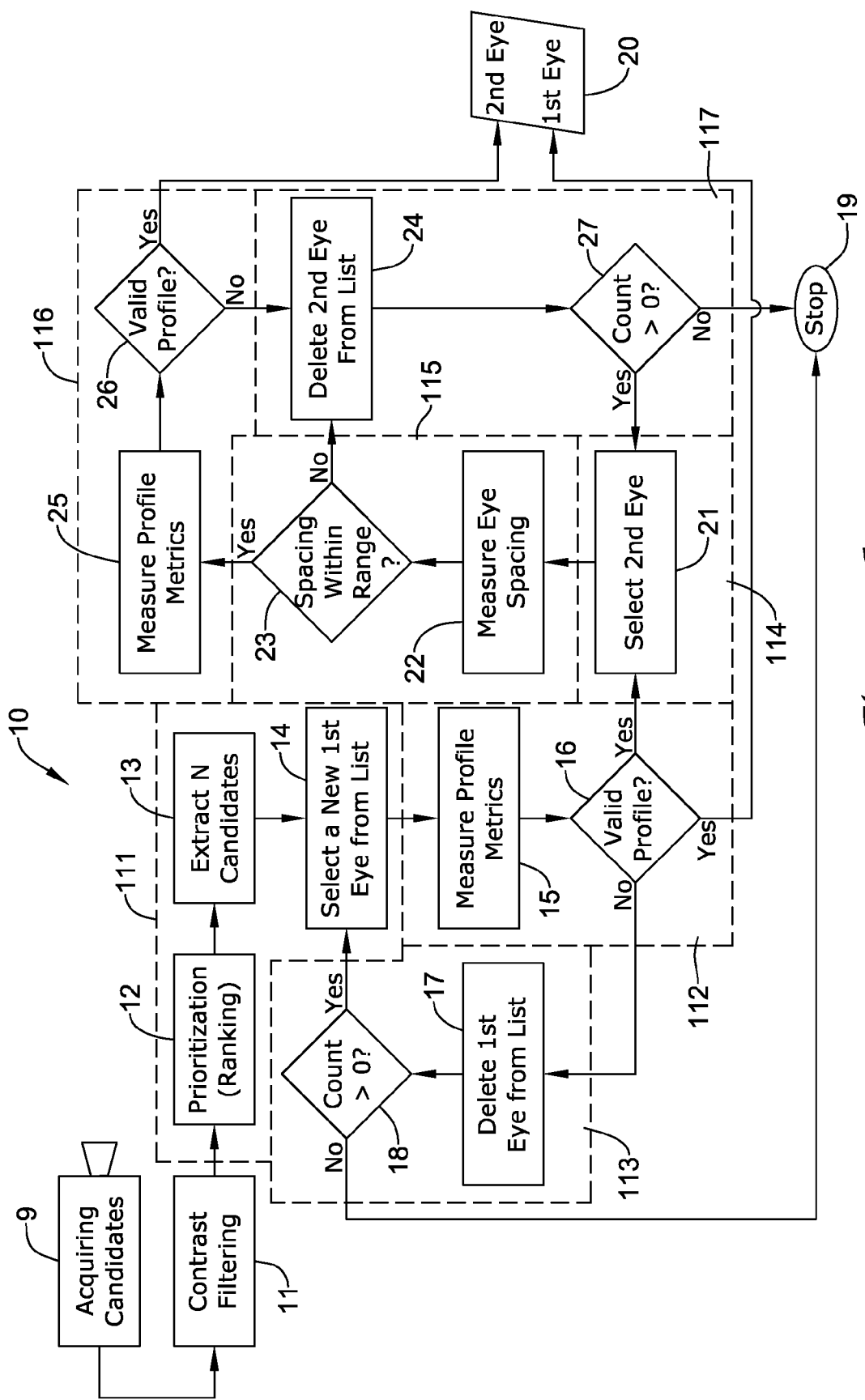
FIG. 1a is a diagram of an overall illustrative structure of an eye finding system.

Eye detection may be the first step toward building a reliable automated iris recognition system in a natural context. Some iris recognition systems rely heavily on predetermined eye locations to properly zoom on the input eye prior to iris segmentation. In addition to biometrics, eye detection (also known as eye finding or eye localization) may support other new technology areas such as eye tracking and human computer interaction or driver drowsiness monitoring systems. Eye detection may serve social learning to identify eye directions like pointing gesture using eye directions.

The present approach and apparatus may be used for finding eyes within a digital image. A local contrast change profiling may be in eye finding. Instead of extracting multiple local features and search globally in the image as many COTS (commercial off-the-shelf) facial recognition packages are based on, the present approach may be based on a system engineering approach to construct the illumination scheme during eye image acquisition to shine the surface of the pupil surface and result into a high reflection point preferably within the pupil of the eye image or close to the pupil of the eye image. This specular reflection point may be used as a reference for an eye search in the digital image. Thus, during the image analysis, the search may be limited to a simplified localization scheme of the highest value pixels associated with these specular reflection pixels and analyze the very local features surrounding these hot spots to confirm an eye profile. To meet the requirements of a real-time system, the eye finding approach may be implemented as a cascade process that divides the local features of an eye into a primary feature of contrast profile associated with high pixel values, depict only potential eye pairs within a specified range, and then test the resulting valid pairs against a feature vector of two or more variables that includes a predefined regular shape fitting with multiple curve fitting measures.

The present approach may be for quickly and robustly localizing the eyes of a human eye in close-up or face images. The approach is based on sensing reflection points within the pupil region as a precursor to the analysis. The approach is formulated to work for cases where reflection is not present within the pupil. The technical approach locates eyes whether there is or there is no reflection. However, in case of the reflection, The detection may hence be simplified to search for these specific reflection points surrounded with dark contrast that represent the pupil. Then the region of interest centered at these potential locations may be processed to find an eye profile. Two valid eyes may be extracted that are within an expected range of eye positioning. The approach for finding eyes decomposes into the following steps. There may be a contrast filter to detect specular reflection pixels. There may be results prioritization to extract valid eye pair with maximum local contrast change. The eye pair may be defined as a valid pair if the two potential eyes are spaced within a predefined range. An adaptive threshold may be applied to detect a central blob. There may be curve fitting of the blob boundaries into a shape. Curve fitness and shape area coverage of the blob surface may be measured for validation. The approach described here may be part of a preprocessing technique used to locate the eyes of a human in a digital image to be processed for iris recognition.

Eye detection may be the first stage for any automated iris recognition analysis system and may be critical for consistent iris segmentation. Several eye detection algorithms may be developed as a basis for face detection. Eye finding approaches may be classified into several categories based upon knowledge based approaches, template matching, and eye socket corner detection. The present approach may address real-time operational requirements. One solution may be to cascade localized features of the eye to speed up the process.

Appearance based approaches using Eigenspace supervised classification technique that is based on learning from a set of training images may be used to capture the most representative variability of eye appearance. Template matching can be regarded as a brute force approach which may include constructing a kernel that is representative of a typical eye socket and convolve the image with the kernel template to identify the highest values of the convolution indicating a match of the eye the identified locations.

Knowledge based approaches may be based on specific rules that are captured by an expert that discriminate the eye local features from any other features. These sets of rules may then be tested against virtually all possible combination to identify the eye locations.

The present approach may provide for quickly and robustly localizing the eyes of a human eye in close-up or face images. The approach may be based on sensing reflection points within the pupil region as a precursor to the analysis. The approach may be also based on sensing the pupil profile in case of no reflection. If reflection is present, the detection may then be simplified to search for these specific reflection points surrounded with dark contrast that represent the pupil. The region of interest centered at these potential locations may then be processed to find an eye profile. Two valid pairs may be extracted that are within an expected range of eye positioning.

The present approach for finding eyes may decompose into the following. To start, the eye may be illuminated to generate a reflection reference point on the pupil surface. The captured wide-field image may be filtered using reflection detection contrast changes to find potential eye locations. For each potential eye location, the local contrast change between the central point and its surrounding pixels may be computed and results may be prioritized to extract valid eye pair with maximum local contrast change. The eye pair may be defined as a valid pair if the two potential eyes are spaced within a predefined range. For each eye of valid eye pair, an adaptive threshold may be executed on a cropped image of the central region of the potential eye to extract a blob of the pupil. Just a single blob may be depicted based on size, its distance to the central point of the cropped image, and how good it fits to a predefined fitting model (e.g., circular shape). With a predefined model shape, such as a circle or an ellipse, the blob edges may be fitted into the pupil fitting model. Curve fitness and model shape area coverage of the blob surface may be measured for validation.

A preprocessing technique may locate the eyes of a human in a digital image to be processed for iris recognition. An overall illustrative structure of an eye finding system 10 is shown in FIG. 1a. The system engineering for eye illumination is not necessarily shown in this system. A digital camera may be used for acquiring 9 images of candidates. The image may be put through a contrast filter 11 to detect relevant high contrast areas of the image. There may a prioritization (i.e., ranking) of the significant spots in the image in block 12. Of these, N candidates may be extracted in block 13. A candidate may have a coordinate $c_1$ (x, y). An output of block 13 may go to block 14 where a new first eye may be selected from the candidate list. From block 14, the eye image candidate may go to a block 15 for a measurement of profile metrics. A profile of the eye may go to a diamond 17 where a determination of the validity of the profile is made. If the profile is not valid, then that first eye may be deleted from the list at block 17. Then at a diamond 18, a count is checked to note whether it is greater than zero. If not, the then this approach is stopped at place 19. If so, then a new first eye may be selected at block 14 from the list from block 13. The profile metrics of this new first eye may be measured at block 15 and passed on to diamond 16 to determine the validity of the profile. If the profile is valid, then the selected first eye may go to place 20, and a second eye is selected at block 21 from the list of candidates from block 13 having a coordinate $c_2$ (x, y). The spacing of the first and second eyes may be determined at block 22 as $D(c_1 (x, y), c_2 (x, y))$. The spacing may be checked to see whether it is within an appropriate range at a diamond 23. If not, then the second eye may be deleted from the list at block 24. If so, then metrics of the profile of the second eye may be measured at block 25. The profile metric may be forwarded to a diamond 26 for a determination of the validity of the profile. If the profile is not valid, then the second eye may be deleted from the list at block 24 and at diamond 27, a question of whether the count is greater than zero. If so, then another second eye may be selected from the list at block 21, and the approach via the blocks 21, 23 and 25, and diamonds 23, 26 and 27 may be repeated. If not, then the approach for the second eye may end at place 19. If the profile is valid at diamond 26, then the selected second eye may go to place 20.

A higher level approach to system 10 in FIG. 1a may include an output of the contrast filtering 11 going a select candidate block 111. An output from block 111 may go to a validate profile block 112. Outputs from block 112 may go to a select candidate block 114 and a result block 20, or eliminate candidate block 113. An output of block 113 may go to the select candidate block 111 and/or to the stop place 19. An output from block 114 may go to a validate pair block 115. Block 115 may provide an output to a validate profile block 116. Outputs from block 116 may go to an eliminate candidate 117 and/or to the result block 20. Outputs of block 117 may go the select candidate 114 and the stop place 19. The processing in system 10 may be digital, although it may be analog, or it may be partially digital and analog.

Figure 1B:
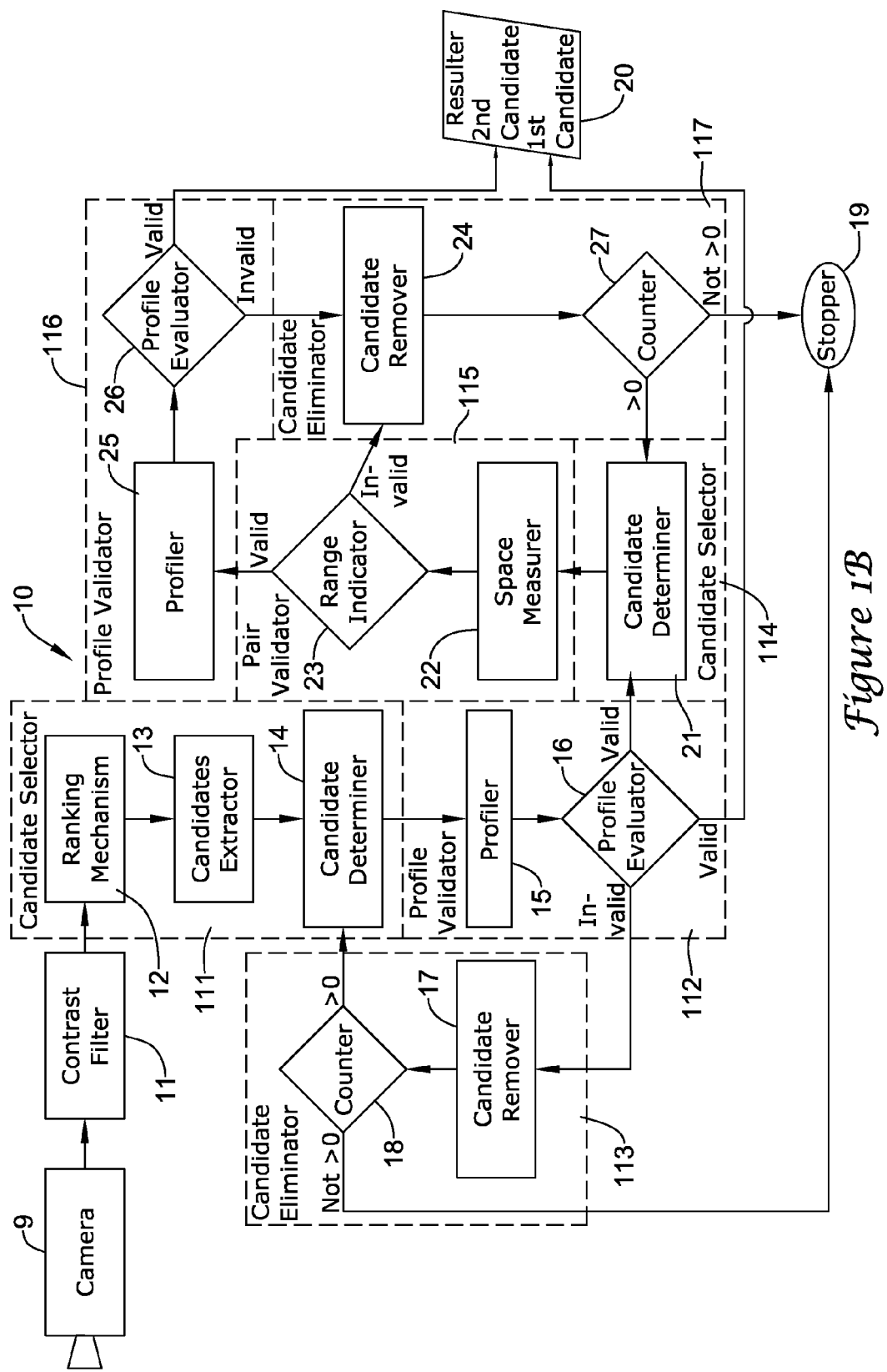
FIG. 1b is a diagram with a group structure of the eye finding system.

FIG. 1b is a diagram with a group structure of the eye finding system 10. The corresponding components (according to reference numbers) of FIG. 1a may have additional description. The candidates noted herein may refer to various images of eyes. A camera 9 may be connected to the contrast filter 11. An output of the filter 11 may go to a ranking mechanism 12, which in turn is connected to the candidates extractor 13. The output of extractor 13 may go to a candidate determiner 14 for selecting a new first candidate. Mechanism 12, extractor 13 and determiner 14 constitute a candidate selector 111.

An output of determiner 14 may go to a metric profiler 15 which in turn has an output connected to a profile evaluator 16. Profiler 15 and evaluator 16 may constitute profile validator 112. Outputs of evaluator 16 may go to candidate determiner 21, resulter 20 and candidate remover 17. Remover may have an output that goes to a counter 18. Candidate remover 17 and counter 18 may constitute a candidate eliminator 113. If counter 18 has a count of greater than zero, an output may go to the candidate determiner 14 for selection of a new candidate. If the output is not greater than zero, then an output may go to the stopper 19.

A candidate determiner 21 for selecting a 2nd candidate may have an output to a space measurer 22. The candidate Space measurer 22 may have an output to the range indicator 23 which may indicate whether the two candidates are at an appropriate distance from each other for validation. Measure 22 and indicator 23 may constitute a pair validator 115. Candidate determiner 21 and previously noted ranking mechanism 12 and candidates extractor 13 may constitute a candidate selector 114. If the pair of candidates is valid then an output from validator 115 may go to a profiler 25, or if the pair is not valid then an output from validator 115 may go to a candidate remover 24. An output of profiler 25 may go to a profile evaluator 26 which may determine whether the profile of the second candidate is valid or not. If valid, then an output of evaluator 26 may provide second candidate information to the resulter 20. If invalid, then an output of evaluator 26 may provide a signal to the candidate remover 24. Profiler 25 and profiler evaluator 26 may constitute a profile validator 116. An output of candidate remover may go to a counter 27. If the counter 27 indicates a value greater than zero then an output may go to the candidate determiner 21 for selecting a second candidate. If the counter 27 indicates a value not greater than zero, then an output may go to a stopper 19. The candidate remover 24 and counter 27 may constitute a candidate eliminator 117.

Figure 2A:
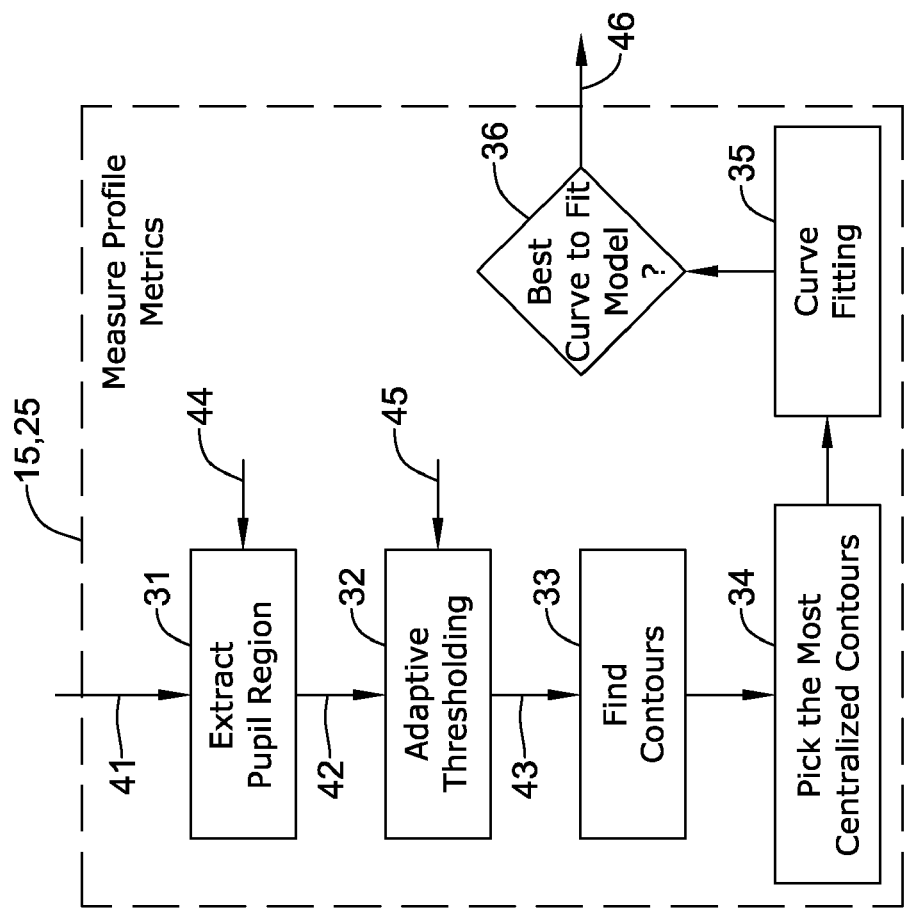
FIG. 2a is a diagram of an approach for determining a profile of an eye as provided by a measure of profile metrics.
Figure 3A:
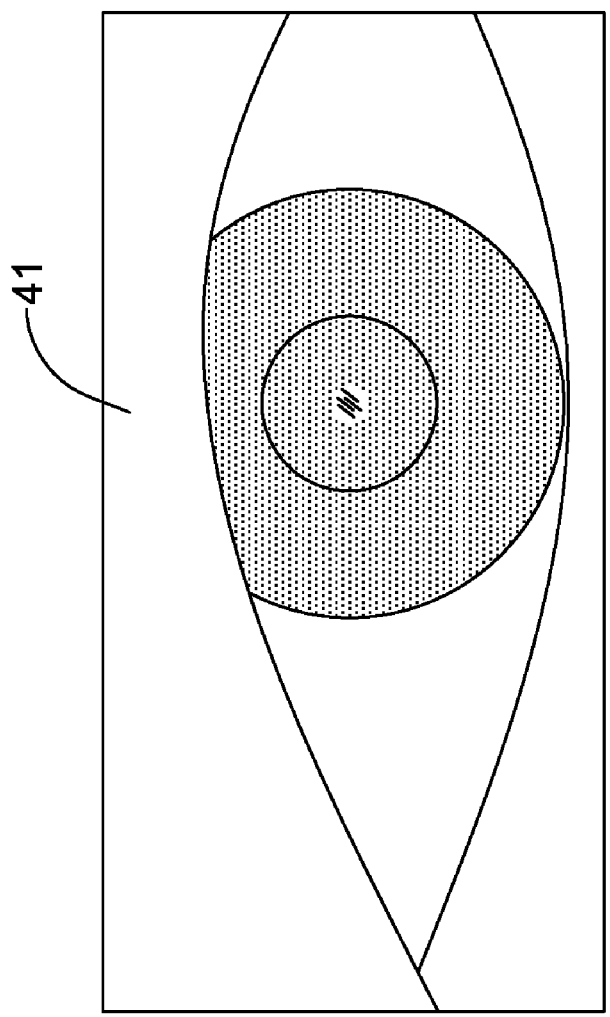
FIGS. 3a, 3b and 3c show an image of a selected eye, a pupil image 42 and a binary image 43 of a pupil, respectively.
Figure 3B:
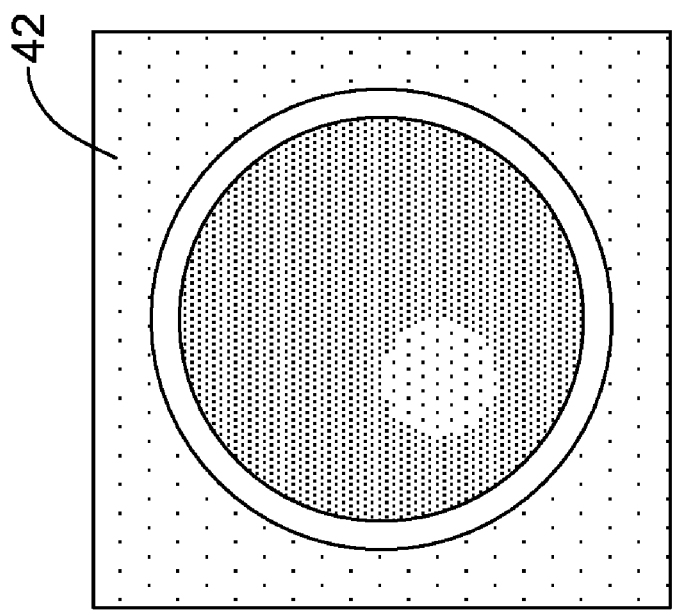
Figure 3C:
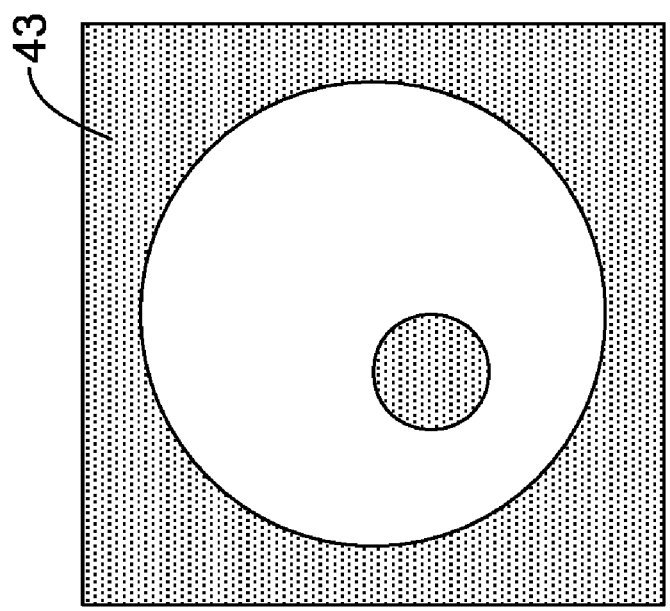

FIG. 2a shows the approach for determining a profile of an eye as provided by a measure profile metrics or eye profiling block 15, 25. An image 41 of a selected eye (FIG. 3a) may go to an extract pupil region block 31. The block dimension is determined based on the maximum expected value of the pupil diameter. A maximum pupil input 44 may be provided to block 31. An output from block may be a pupil image 42 (FIG. 3b) which goes to an adaptive thresholding block 32. A percent input 45 may be provided to block 32. The pixel distribution to compute the intensity histogram may be provided to block 32. An output of block 32 may be a binary image 43 (FIG. 3c) of the pupil which effectively covers a region of interest. The output of block 32 may go to a find contours block 33. The found contours of image 43 may go to a select n (two or more) most centralized contours block 34. The selected most centralized contours may go to a curve fitting block 35 to curve fit the boundary of the pupil blob to a circle, ellipse or the like. The circle may be adequate for virtually all cases. The output of the curve fitting block may go to a diamond 36 to indicate the level of curve fitness and its' adequacy. The approach is to loop through the n depicted contours to pick the contour that fits the most or best to the model based on the perimeter and coverage fitting. An output 46 from diamond 36 may provide pupil information such as the curve fitting, whether the item is an eye, based upon the fitness measures, the percent of pixels within the curve that fit well the model, the radius and center of the pupil model, and the proportion of the blob that is contained within the pupil model.

Figure 2B:
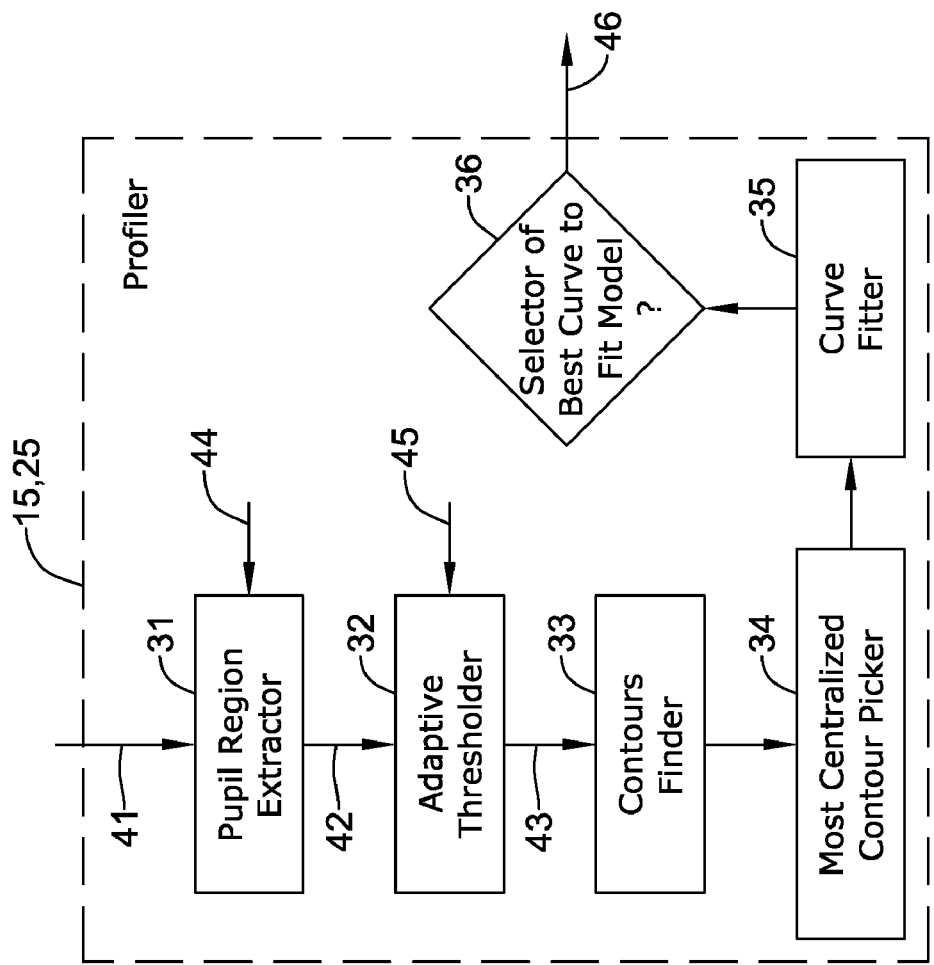
FIG. 2b is a diagram of a structure of a profiler.

FIG. 2b is a structural version of FIG. 2a. A pupil region extractor 31 of profiler 15, 25 may be connected to an output of the candidate selector 111 or 114 of FIG. 1b. An image 41 and a maximum pupil signal 44 may be input to extractor 31. An output of the extractor 31 may be connected to an adaptive thresholder 32. A percent input 45 may be provided to the thresholder 32. The output 43 (e.g., binary image) may go to a contours finder 33. An input to a most centralized contour picker 34 may be from contours finder 33. An output of the picker 34 may go to a curve fitter 35. An input to the selector of the best curve to fit the model diamond 36 may be from the curve fitter 35. An output 46 may provide pupil information 46 to a profile evaluator 16 or 26.

For the thresholding of block 32, the threshold may be adaptively set based upon the histogram distribution of the intensities of the pixel within the region of interest. A minimum threshold is based upon the coverage of the object of interest (pupil) in pixels with respect to the size of the ROI image (i.e., region of interest). The percentage of the blob size with respect to the ROI is assumed to be at least the ratio of the minimum expected size of a pupil blob (i.e., pupil surface) with respect to the ROI surface (chosen to be the same size of the maximum expected pupil diameter). Hence, the percentage ratio, λ, may be computed with the following equation.

$$\lambda_{min} = \frac{E[S_p]}{S_{ROI}} \geq \frac{\pi R_m^2}{4 R_M^2} = .7854 \left(\frac{R_m}{R_M}\right)^2 \tag{1}$$

Where $R_m$ and $R_M$ represent the minimum and maximum possible values of expected radius of the pupil, $S_p$ is the minimum surface of the pupil, $S_{ROI}$ is a surface that is a region of interest, and E[ ] is an expected value operator.

Fitness metrics may be used within the eye profiling procedure. At least two metrics can be detected to measure how good the estimated regular shape fits the detected curve at the boundary of the pupil blob. The first curve fitting metric may incorporate the following formula.

$$\eta_1 = \frac{1}{N} \oint_{Blob} u \left( \left| \frac{F(x,y) - f(x,y)}{F(x,y) - F_c(x,y)} \right| - \varepsilon \right) dx\, dy$$

In the above equation, the curve f(x, y) represents the boundary of the blob, F(x, y) is the border curve of estimated fitting shape, and $F_c$ (x, y) is the moment center of the model shape. N in the above equation represents the length of the curve f(x, y) the operator u( ) is the step function and ε<<1 is a tolerance factor.

Another consideration may be given to measuring the proportion of the blob within the estimated model curve. A fitting metrics may be basically the ratio of the estimated shape surface coverage or intersection of the surface of the model and the blob over the blob surface.

$$\eta_2 = \frac{\text{Surface} (blob \cap F(x, y))}{S_{blob}},$$

where $S_{blob}$ is the surface of the blob.

A rectilinear image rotation angle may be noted. An iris image capture system that captures both eyes simultaneously may provide a way to measure a head tilt angle. By detecting pupil regions of both eyes during an eye finding procedure, one may calculate the angle of the line passing through both pupil center masses and the horizontal axis of the camera. The eye finder system 10 may then extract both eye images at the estimated orientation axis of the eyes. A misalignment in line detection may be further addressed using the nature of the matching approach which accounts for any non-significant eye orientation. The advantage of the present preprocessing approach is that one may reduce the amount of shifting of bits during the matching process to a few bits thus yielding to faster time response of the system. If rotation correction is not performed, the matching uncertainty may be set to maximum and thus the barcode bit shifting is set to its maximum. On the other hand, if such correction is performed, the matching process may be limited to just a few bits shifted to account for any misalignments of eyes with images in the database.

FIG. 2b is a diagram of a structure of a profiler.

Figure 4:
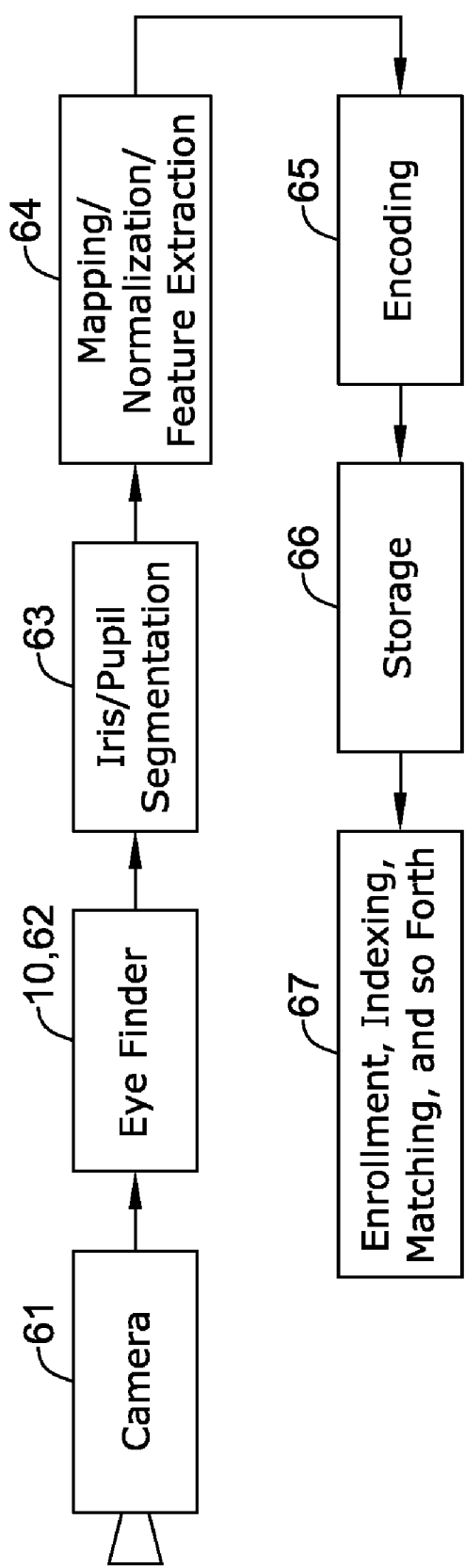
FIG. 4 is a diagram of an overall iris recognition system.

The overall eye detection system is shown in FIG. 4. It shows a camera 61 that may provide an image with a face in it to the eye finder 10 as noted herein. The eyefinder 10, 62 may provide an image of one or two eyes that go to the iris segmentation block 63. A polar segmentation (POSE) system in block 63 may be used to perform the segmentation. POSE may be based on the assumption that image (e.g., 320×240 pixels) has a visible pupil where iris can be partially visible. There may be pupil segmentation at the inner border between the iris and pupil and segmentation at the outer border between the iris and the sclera and iris and eyelids. An output having a segmented image may go to a block 64 for mapping/normalization and feature extraction. An output from block 64 may go to an encoding block 65 which may provide an output, such as a barcode of the images to block put in terms of ones and zeros. The coding of the images may provide a basis for storage in block 66 of the eye information which may be used for enrolling, indexing, matching, and so on, at block 67, of the eye information, such as that of the iris and pupil, related to the eye.

Figure 5:
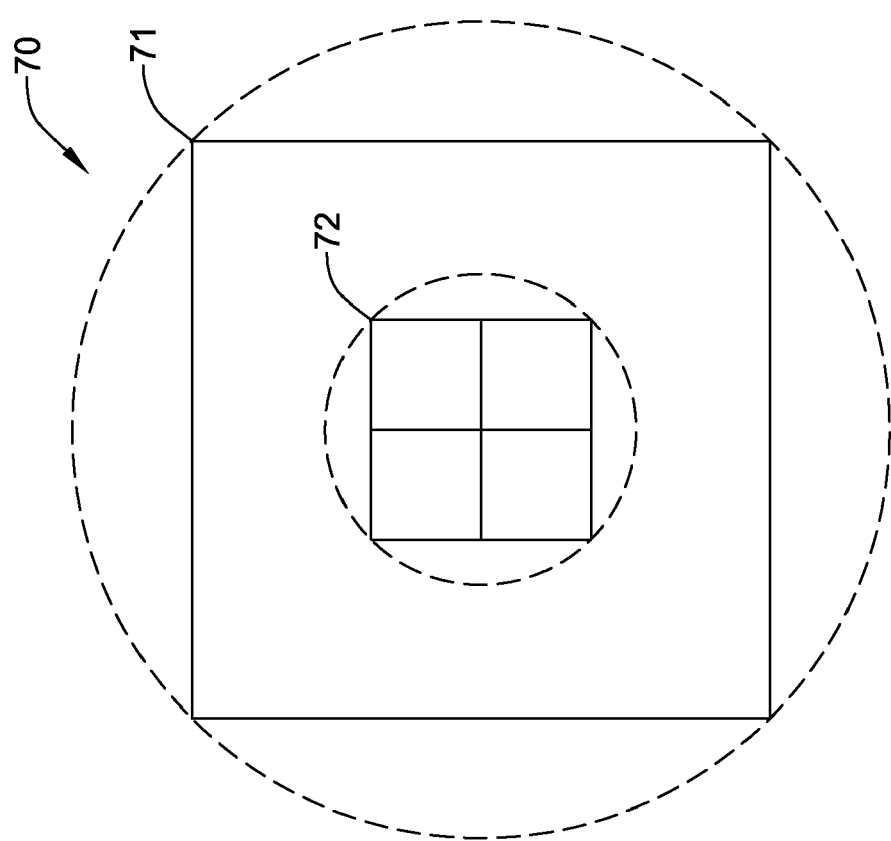
FIG. 5 shows a diagram of a kernel having a box representing the diameter of a pupil and a box representing a pupil reflection.

FIG. 5 shows a diagram of a kernel 70 of a candidate which may be one of several candidates. Box 71 may be selected to fit within a circular shape that would represent the minimum possible diameter of the pupil. Box 72 may be selected to fit within a circular shape that might represent the maximum size of the reflection. The actual circular shapes in FIG. 5 may be used instead of the boxes 70 and 71; however, the circular shape requires much computation and the square shape or box may be regarded as being an adequate approximation. This mechanism may be used to locate pupil location candidates.

A blob suspected of being a pupil may be profiled with a fitness curve on its outer portion. If the curve fits a predefined model like a circle, then one may give it a score of a certain percent of fitness. A second part of the fitness check is to determine what percentage of the pixels of the pupil is contained within the model curve. If the fitness percentages are significant enough to a predefined level, then one might assume that the object scrutinized is a pupil. If so, then the object is checked relative to a range of distance between two eyes.

Figure 6:
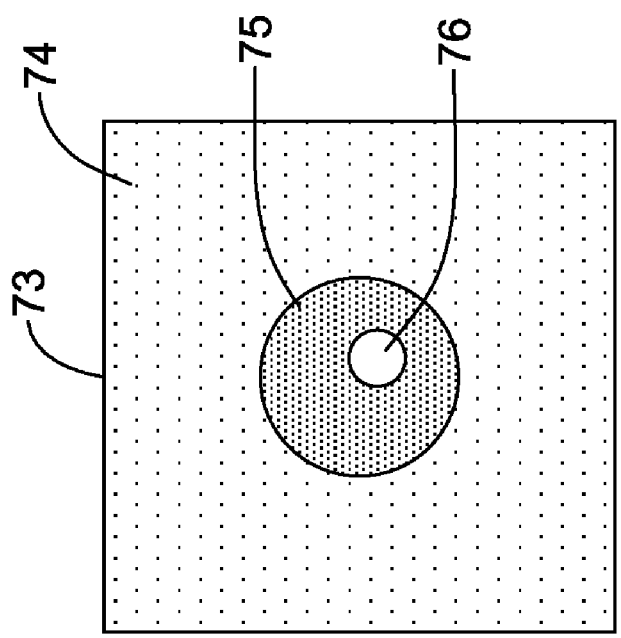
FIG. 6 shows a box representing a region of interest having areas which are relatively light, dark and lighter than the relatively light area situated in the dark area representing a pupil model.
Figure 7:
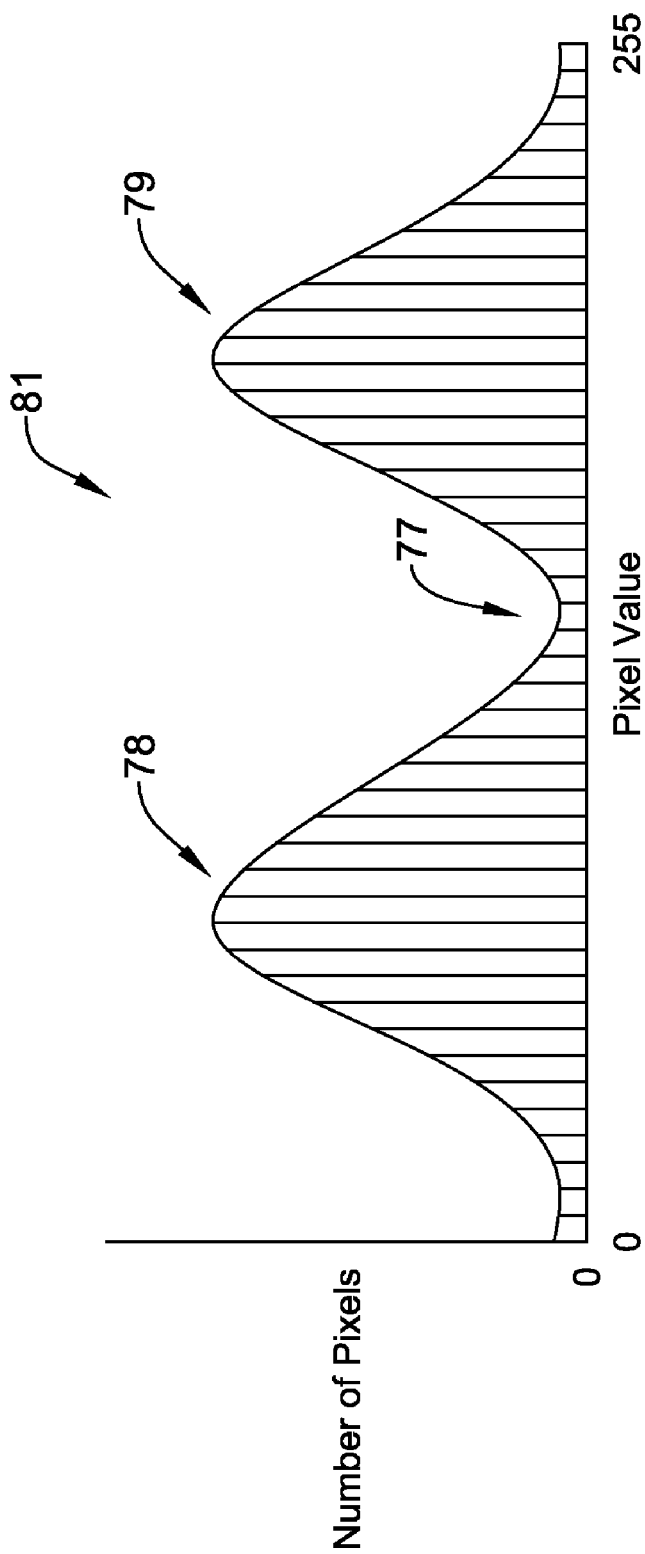
FIG. 7 is a histogram of the contrast or intensity values of areas of FIG. 6.

A threshold level, λ, may be adaptive based on contrast, illumination, and other information. The threshold may be determined with the equation noted herein for $\lambda_{min}$. FIG. 6 shows a box 73 which may be a region of interest. An area 74 may be of a first color which is relatively light. An area 75 may be of a second color that is dark. An area 76 may be of a third color that is lighter than the first color. A histogram may be taken of the contents of box or region 73. The histogram may look like the graph of FIG. 7. The ordinate axis represents the number of pixels having a contrast or intensity (i.e., lightness/darkness) value of the values represented on the abscissa axis, which range from 0 to 255, i.e., from dark to light, respectively. The result is two peaks 78 and 79 with a middle point 77 which may be associated with the $\lambda_{min}$. The plot 81 appears normal. Other plots having one peak, a flat peak or peaks, peaks having a large separation, or other appearance that appear abnormal relative to plot generally indicate an unacceptable situation. One may note that the present approach utilizes adaptive thresholding which has a threshold that is not fixed or arbitrary. The depicted threshold is limited with the minimum value of that defined by equation (1).

Figure 8:
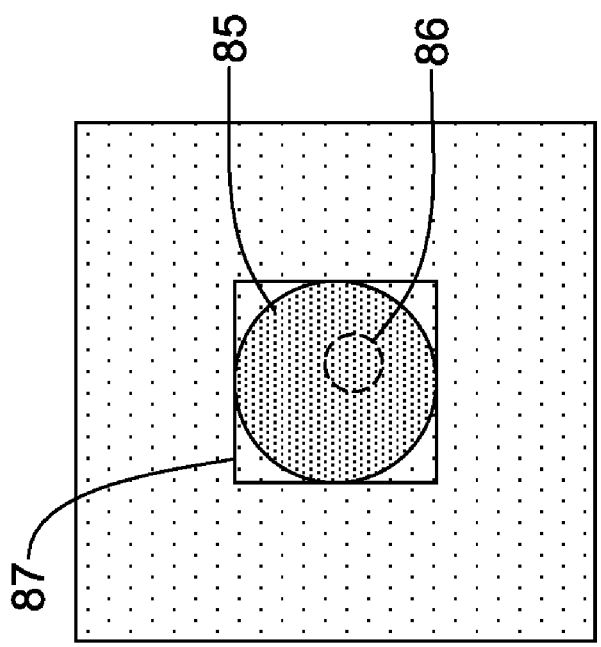
FIG. 8 is like FIG. 6 but does not have a lighter (modeling a typical reflection) than the relatively light area situated in the dark area representing a pupil.
Figure 9:
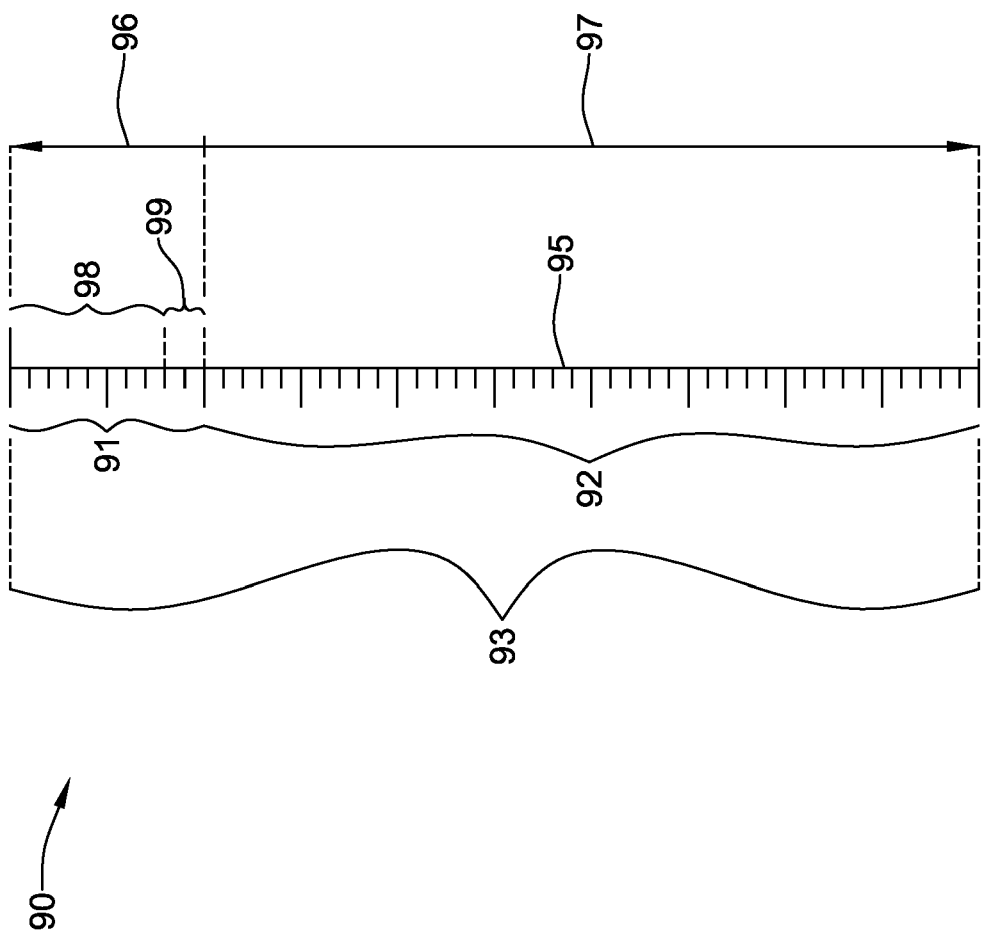
FIG. 9 is a scale of marks representing pixels of a region of interest ranked according to lightness and darkness.

There may be a situation where there is no reflection to be found on a pupil. FIG. 8 is like FIG. 6 which has an area 76 of reflection on pupil 75 which FIG. 8 does not have. However, an area 86 of reflection may be assumed for the pupil 85 in FIG. 8. The pixels of a region of interest or kernel 87 may be ranked according to lightness and darkness as represented by marks on a scale 95 of diagram 90 as shown in FIG. 9. An arrow 96 represents a direction of increasingly lighter pixels. An arrow 97 represents a direction of increasingly darker pixels. For illustrative purposes, each mark may represent a pixel; although each mark could represent any number of pixels or a fraction of a pixel or pixels. The kernel 87 size may be N pixels. N pixels may be represented by a group 93 of marks on a scale 95. The reflection 86 may be represented by "$N_{rfc}$". "$N_{rfc}$" may refer to the reflection 86 pixels. The "$N_{rfc}$" pixels may be represented by a group 91 of marks on scale 95. "N-$N_{rfc}$" may represent the dark area 85. The "N-$N_{rfc}$" pixels may be represented by a group 92 of marks on scale 95.

In cases where we have reflections on the pupil, the measure may be defined as the argument of the maximum difference between the reflection pixel measure (local maxima) within the reflection spot and the average mean of the dark pixels that represent the pupil profile. Hence, $$C_{pupil}(x, y) = \arg\max_{(x,y)}(v_{max} - \mu_o)$$

The vector $\vec{v}(n)$ is the kernel elements sorted in a descending order based on the intensity values as shown in FIG. 9. An average value of intensity may be calculated for each group of pixels.

For the "$N_{rfc}$" group 91, one may have the local maxima of the reflection spot $v_{max}$ estimated as the average mean of only the first K elements of the reflection pixels. K may be selected to be such as K≪$N_{rfc}$. For the "N-$N_{rfc}$" group 92, one may have "$\mu_o$", $$\mu_o = \frac{1}{N_{km}} \sum_{N_{rfc}<n<N_{km}} \vec{v}(n)$$

Figure 10A:
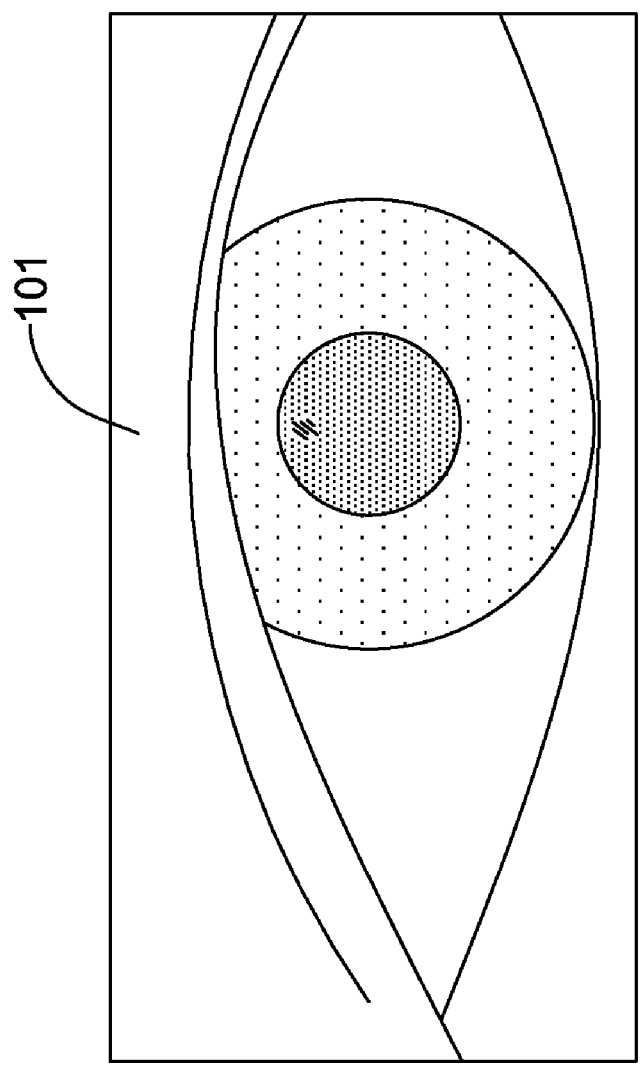
FIGS. 10a and 10b relate to eye finding using reflection and/or non-reflection measures.
Figure 10B:
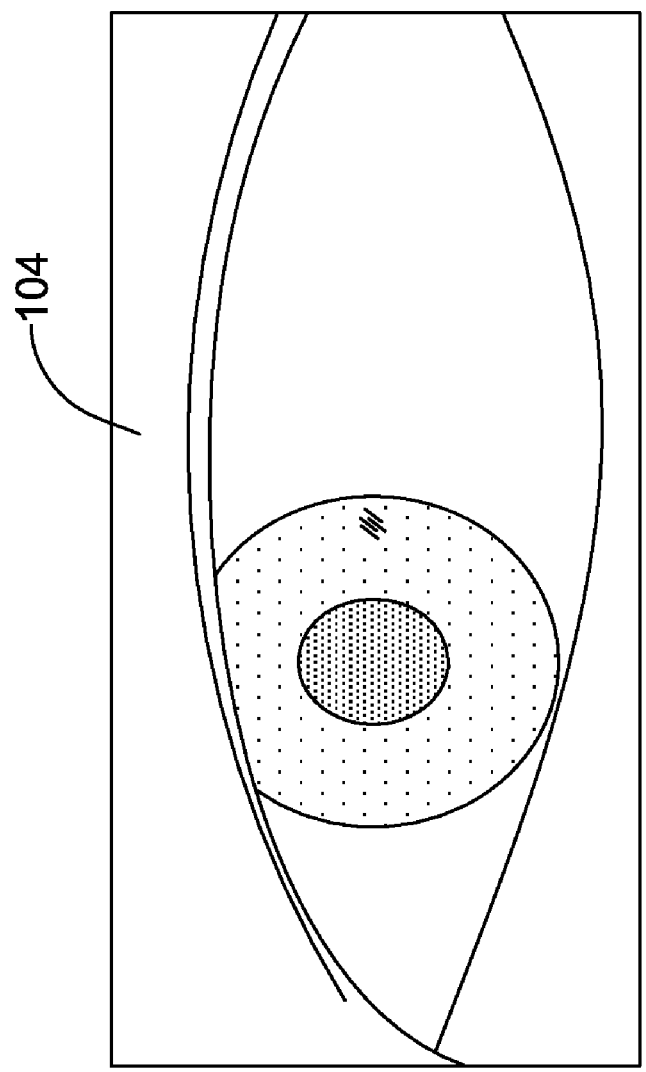

FIGS. 10a and 10b relate to eye finding using reflection and/or non-reflection measures relative to eyes 101 and 104, respectively. For a situation of no actual reflection on the pupil, then there may be a representative value of the dark pixels in the bottom scale that maximize the argument $1/\mu_o$. This may be true for either condition whether there is reflection or no reflection. Hence, the formulas may be combined into one to work for both situations as indicated by the following equation, $$C_{pupil}(x, y) = \arg\max_{(x,y)}\left(\frac{(\vartheta_{max} - \mu_o)}{\mu_o(x, y)}\right).$$

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A computer implemented eye detection system for detecting eyes in a digital image, the system comprising:
a digital image capture device; and
a processor, the processor including:
a filter;
a first eye candidate selector connected to the filter;

a first profile validator connected to the eye candidate selector, the first profile validator including measurements of eye candidate pupil contours;
a first eye candidate eliminator connected to the first profile validator and the first eye candidate selector;
a second eye candidate selector connected to the first profile validator;
a pair validator connected to the second eye candidate selector, the pair validator including a space measurer that determines if the first and second eye candidates are at an appropriate distance from each other;
a second profile validator connected to the pair validator; and
a second eye candidate eliminator connected to the second profile validator and the second eye candidate selector;
wherein the first profile validator comprising a first profiler connected to the first eye candidate selector, and a first profile evaluator connected to the first profiler, the first eye candidate eliminator and the second eye candidate selector;
wherein the second profile validator comprises a second profiler connected to the pair validator, and a second profile evaluator connected to the second profiler and the second eye candidate eliminator;
wherein the first profiler comprises:
 a pupil region extractor connected to the first eye candidate selector;
 an adaptive thresholder connected to the pupil region extractor;
 a contours finder connected to the adaptive thresholder;
 a contour picker connected to the contours finder;
 a curve fitter connected to the contour picker; and
 a curve selector connected to the curve fitter and the first profile evaluator; and
wherein the second profiler comprises:
 a pupil region extractor connected to the pair validator;
 an adaptive thresholder connected to the pupil region extractor;
 a contours finder connected to the adaptive thresholder;
 a contour picker connected to the contours finder;
 a curve fitter connected to the contour picker; and
 a curve selector connected to the curve fitter and the second profile evaluator.

2. The system of claim 1, further comprising:
a resulter connected to the first and second profile validators; and
a stopper connected to the first and second eye candidate eliminators.

3. The system of claim 1, wherein:
the first eye candidate selector comprises:
 a ranking mechanism connected to the filter;
 an eye candidates extractor connected to the ranking mechanism; and
 a first eye candidate determiner connected to the eye candidate extractor, a first profiler and the first eye candidate eliminator; and
the second eye candidate selector comprises:
 the ranking mechanism connected to the filter;
 the eye candidates extractor connected to the ranking mechanism; and
 a second eye candidate determiner connected to the first profile evaluator, the pair validator and the second eye candidate eliminator.

4. A computer implemented method for finding an eye in a digital image, comprising:
providing a digital image capture device and a processor;
obtaining a digital image containing eye candidates from the digital image capture device; and
processing the digital image to find an eye with the processor, the processing including:
 contrast filtering the eye candidates;
 selecting a first eye from the eye candidates;
 validating a profile of the first eye;
 selecting a second eye from the eye candidates;
 validating an amount of space between the first and second eyes;
 validating a profile of the second eye, wherein validating the profile of the first and second eyes includes measuring pupil contours;
 eliminating the first eye if the first eye has an invalid profile;
 eliminating the second eye if the amount of space between the first and second eyes is invalid; and
 eliminating the second eye if the amount of space between the first and second eyes is valid and the second eye has an invalid profile.

5. A computer implemented eye detection system for detecting eyes having pupils in a digital image, the system comprising:
a digital image capture device; and
a processor, the processor including:
 a filter;
 a first eye candidate selector connected to the filter;
 a first profile validator connected to the eye candidate selector, the profile validator including measurements of pupil contours;
 a first eye candidate eliminator connected to the first profile validator and the first eye candidate selector;
 a second eye candidate selector connected to the first profile validator;
 a pair validator connected to the second eye candidate selector, the pair validator including a space measurer that determines if the first and second eye candidates are at an appropriate distance from each other;
 a second profile validator connected to the pair validator; and
 a second eye candidate eliminator connected to the second profile validator and the second eye candidate selector;
 wherein the first profile validator comprises:
  a first profiler connected to the first eye candidate selector; and
  a first profile evaluator connected to the first profiler, the first eye candidate eliminator and the second eye candidate selector; and
 wherein the second profile validator comprises:
  a second profiler connected to the pair validator; and
  a second profile evaluator connected to the second profiler and the second eye candidate eliminator;
 wherein the first profiler comprises:
  a pupil region extractor connected to the first eye candidate selector;
  an adaptive thresholder connected to the pupil region extractor;
  a contours finder connected to the adaptive thresholder;
  a contour picker connected to the contours finder;
  a curve fitter connected to the contour picker; and
  a curve selector connected to the curve fitter and the first profile evaluator; and wherein the second profiler comprises:
a pupil region extractor connected to the pair validator;
an adaptive thresholder connected to the pupil region extractor;
a contours finder connected to the adaptive thresholder;
a contour picker connected to the contours finder;
a curve fitter connected to the contour picker; and
a curve selector connected to the curve fitter and the second profile evaluator.

6. An eye finder system for finding eyes in a digital image comprising:
a camera;
a filter connected to the camera;
an eye candidate lister connected to the filter;
an eye selector connected to the eye candidate lister;
an eye profile evaluator connected to the eye selector; and
an eye eliminator connected to the eye profile evaluator;
wherein the eye eliminator comprises:
a deleter, connected to the eye profile evaluator, for removing the eye from a list provided by the eye candidate lister if the eye profile evaluator indicates a profile of the eye to be invalid; and
a counter connected to the deleter and to the eye selector;
if the counter has a count greater than zero, then the eye selector may select a new eye from the list provided by the eye candidate lister; or
if the counter has a count not greater than zero, then the system may stop.

7. The system of claim 1, wherein an adaptive threshold is computed adaptively based upon a pupil size and a contrast distribution of an image region having a pupil and its surrounding area.

8. The system of claim 1, wherein the pair validator comprises:
a range indicator connected to the space measurer and the second profile validator.

9. The system of claim 1, further comprising:
a resulter connected to the first and second profile validators; and
wherein the resulter is for receiving a valid pair of eye candidates.

10. The system of claim 1, wherein:
the filter is a contrast filter.

11. The system of claim 10, wherein the contrast filter is based upon a pupil dark profile with respect to its surroundings.

12. The system of claim 10, wherein the contrast filter is based upon a light reflection profile with respect to its surroundings.

13. A computer implemented method for finding an eye in a digital image, comprising:
providing a digital image capture device and a processor;
obtaining a digital image containing eye candidates from the digital image capture device; and
processing the digital image to find an eye with the processor, the processing including:
contrast filtering the eye candidates;
selecting a first eye from the eye candidates;
validating a profile of the first eye;
selecting a second eye from the eye candidates;
validating an amount of space between the first and second eyes;
validating a profile of the second eye, wherein validating the profile of the first and second eyes includes measuring pupil contours;
eliminating the first eye if the first eye has an invalid profile;
eliminating the second eye if the amount of space between the first and second eyes is invalid; and
eliminating the second eye if the amount of space between the first and second eyes is valid and the second eye has an invalid profile.

14. The method of claim 13, wherein:
the selecting a first eye comprises:
prioritizing the eye candidates according to contrast into a first list of eye candidates;
extracting a number of eye candidates from the first list of eye candidates into a second list of eye candidates; and
selecting a first eye from the second list of eye candidates; and
the selecting a second eye comprises selecting a second eye from the second list of eye candidates.

15. The method of claim 14, wherein:
the validating a profile of first eye comprises:
measuring profile metrics of the first eye; and
determining whether the profile metrics of the first eye are valid; and
the validating a profile of second eye comprises:
measuring profile metrics of the second eye; and
determining whether the profile metrics of the second eye are valid.

16. The method of claim 15, wherein the validating an amount of space between the first and second eyes comprises:
measuring a spacing between the first and second eyes; and
determining whether the spacing is within a valid range.

17. An eye finder system for finding eyes in a digital image comprising:
a camera;
a filter connected to the camera;
an eye candidate lister connected to the filter;
an eye selector connected to the eye candidate lister;
an eye profile evaluator connected to the eye selector, the eye profile evaluator measuring pupil image and pupil contours, and including a pair validator, the pair validator including a space measurer that determines if the first and second eye candidates are at an appropriate distance from each other; and
an eye eliminator connected to the eye profile evaluator, the eye eliminator comprising:
a deleter, connected to the eye profile evaluator, for removing the eye from a list provided by the eye candidate lister if the eye profile evaluator indicates a profile of the eye to be invalid; and
a counter connected to the deleter and to the eye selector;
wherein if the counter has a count greater than zero, then the eye selector may select a new eye from the list provided by the eye candidate lister; or
if the counter has a count not greater than zero, then the system may stop.

18. The system of claim 17, further comprising:
a second eye selector connected to the eye profile evaluator;
an eye pair evaluator connected to the second eye selector; and
a second profile evaluator connected to the eye pair evaluator.

19. The system of claim 18, wherein if the profile evaluator and the second profile evaluator indicate that a first eye and a second eye have appropriate metrics, and the eye pair evaluator determines that the first eye and second eye are appropriately spaced from each other, then the first and second eyes or portions of them are acceptable for review, recordation, analysis, segmentation, mapping, normalization, feature extraction, encoding, storage, enrollment, indexing, matching, and/or the like.

20. The system of claim 18, wherein if just one eye is indicated by one or more profile evaluators to have appropriate metrics, then the eye or a portion of it is acceptable for review, recordation, analysis, segmentation, mapping, normalization, feature extraction, encoding, storage, enrollment, indexing, matching, and/or the like.

21. The system of claim 17, wherein the eye profile evaluator comprises:
   a pupil region extractor connected to the eye selector;
   an adaptive thresholder connected to the pupil region extractor;
   a contours finder connected to the adaptive thresholder;
   a contour picker connected to the contours finder;
   a curve fitter connected to the contour picker; and
   a best curve selector connected to the curve fitter.

* * * * *